(12) United States Patent
Zeiler et al.

(10) Patent No.: US 11,197,414 B2
(45) Date of Patent: Dec. 14, 2021

(54) SYSTEMS AND DEVICES FOR AUTONOMOUS LAWN CARE

(71) Applicant: Briggs & Stratton Corporation, Wauwatosa, WI (US)

(72) Inventors: Jeffrey M. Zeiler, Pewaukee, WI (US);
Robert Pjevach, Wauwatosa, WI (US);
Kyle Harvey, West Allis, WI (US);
Nicholas Zeidler, Brookfield, WI (US);
Jacob Schmalz, Milwaukee, WI (US);
Peter D. Shears, Wauwatosa, WI (US);
Todd Johnson, Wauwatosa, WI (US);
Ryan T. Hahn, Elm Grove, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 0 days.

(21) Appl. No.: 16/258,518

(22) Filed: Jan. 25, 2019

(65) Prior Publication Data
US 2019/0230850 A1 Aug. 1, 2019

Related U.S. Application Data

(60) Provisional application No. 62/622,717, filed on Jan. 26, 2018.

(51) Int. Cl.
| | |
|---|---|
| *B60W 50/14* | (2020.01) |
| *A01D 34/00* | (2006.01) |
| *G05D 1/00* | (2006.01) |
| *B65G 67/02* | (2006.01) |
| *G05D 1/02* | (2020.01) |

(52) U.S. Cl.
CPC .......... *A01D 34/008* (2013.01); *B65G 67/02* (2013.01); *G05D 1/0027* (2013.01); *G05D 1/0088* (2013.01); *G05D 1/0287* (2013.01); *G05D 2201/0208* (2013.01)

(58) Field of Classification Search
CPC .. A01D 34/008; A01D 75/006; G05D 1/0027; G05D 1/0287; G05D 1/0088; G05D 2201/0208; B65G 67/02
USPC ......................................................... 701/50
See application file for complete search history.

(56) References Cited

U.S. PATENT DOCUMENTS

| | | | |
|---|---|---|---|
| 8,392,044 B2 | 3/2013 | Thompson et al. | |
| 8,938,318 B2 | 1/2015 | Bergstrom et al. | |
| 8,942,862 B2 | 1/2015 | Markusson et al. | |
| 9,137,943 B2 | 9/2015 | Einecke et al. | |
| 9,405,294 B2 | 8/2016 | Jagenstedt et al. | |
| 9,471,063 B2* | 10/2016 | Ouyang | G05D 1/0265 |
| 2003/0144774 A1* | 7/2003 | Trissel | A01D 34/008 701/23 |
| 2006/0059880 A1* | 3/2006 | Angott | A01D 34/008 56/10.2 A |
| 2009/0183478 A1* | 7/2009 | Bernini | A01D 34/008 56/10.2 A |

(Continued)

*Primary Examiner* — Jonathan M Dager
*Assistant Examiner* — Jean W Charleston
(74) *Attorney, Agent, or Firm* — Foley & Lardner LLP

(57) ABSTRACT

A system for providing autonomous lawn care services. The system includes a number of autonomous outdoor power devices, and one or more service vehicles. The one or more service vehicles are configured to selectively load and unload one or more of the autonomous outdoor power devices at a jobsite based on instructions received by a controller of the one or more service vehicles.

13 Claims, 10 Drawing Sheets

(56) References Cited

U.S. PATENT DOCUMENTS

| | | | |
|---|---|---|---|
| 2012/0222395 A1* | 9/2012 | Grewe | A01D 34/74 |
| | | | 56/17.2 |
| 2014/0032033 A1* | 1/2014 | Einecke | A01D 34/008 |
| | | | 701/24 |
| 2015/0153175 A1* | 6/2015 | Skaaksrud | G06Q 10/0833 |
| | | | 701/23 |
| 2015/0174766 A1* | 6/2015 | Jagenstedt | B25J 11/008 |
| | | | 700/257 |
| 2016/0115933 A1* | 4/2016 | Koenen | A01D 34/6818 |
| | | | 290/38 R |
| 2016/0334801 A1* | 11/2016 | Ratanaphanyarat | ............ |
| | | | G05D 1/0246 |
| 2018/0103579 A1* | 4/2018 | Grufman | G05D 1/0088 |
| 2018/0184586 A1* | 7/2018 | Song | A01D 34/828 |
| 2018/0352730 A1* | 12/2018 | Gorenflo | A01D 34/008 |
| 2018/0376357 A1* | 12/2018 | Tavares Coutinho | ............ |
| | | | H04W 48/20 |
| 2019/0110395 A1* | 4/2019 | Andersson | G05D 1/0287 |
| 2019/0160972 A1* | 5/2019 | Zeiler | H02J 7/0063 |

\* cited by examiner

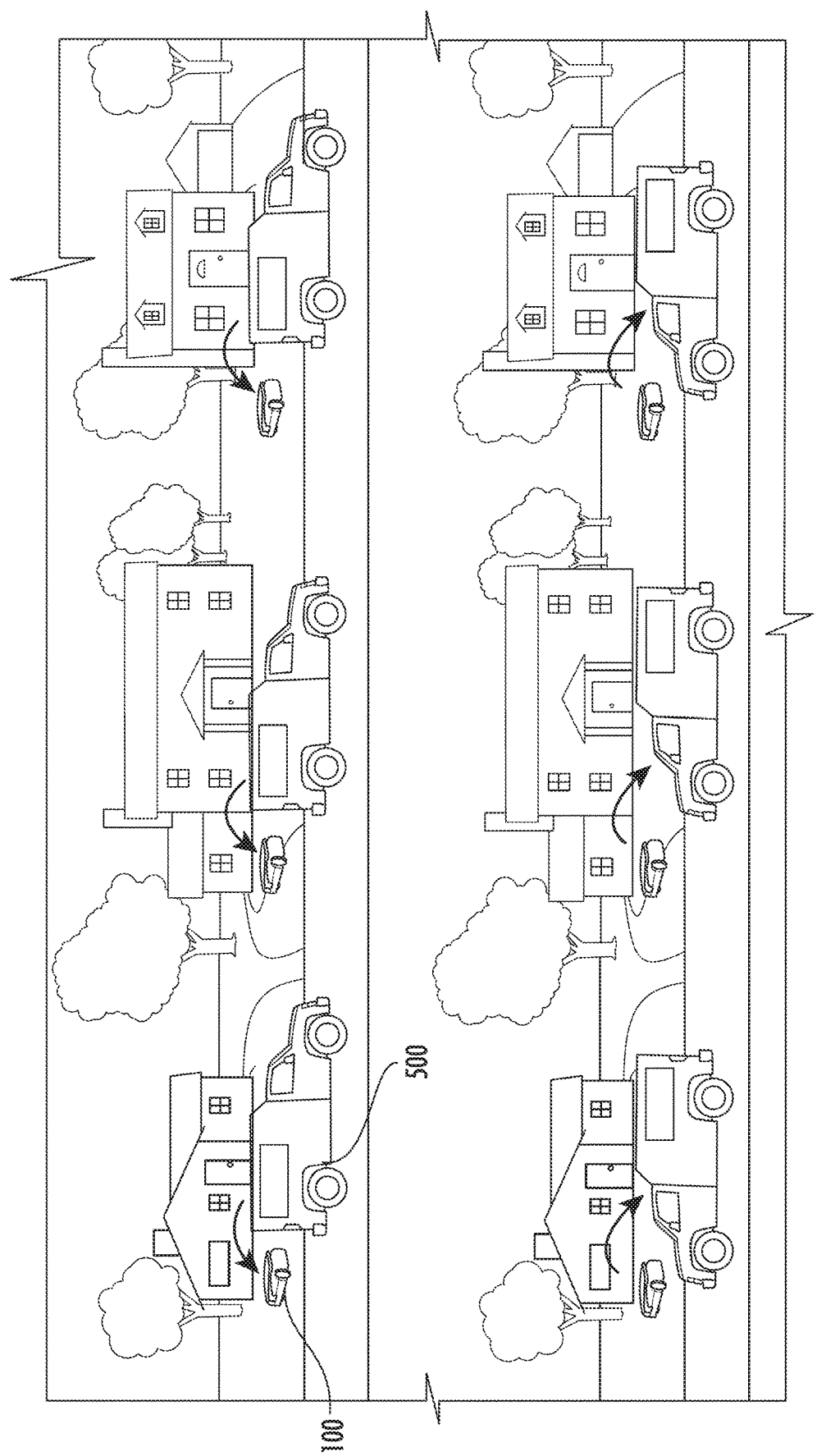

SYSTEMS AND DEVICES FOR AUTONOMOUS LAWN CARE

CROSS-REFERENCE TO RELATED APPLICATIONS

This application claims the benefit of U.S. Application No. 62/622,717, filed Jan. 26, 2018, which is incorporated herein by reference in its entirety.

BACKGROUND

The present invention generally relates to outdoor power equipment. More specifically, the present invention relates to autonomous lawn care devices.

SUMMARY

The present disclosure relates an autonomous lawn mower, according to some embodiments. The autonomous lawn mower includes a removable battery, a number of sensors, one or more antennas, and a controller. The controller is configured to allow the autonomous lawn mower to perform a grass cutting function at a jobsite without human interaction.

Another embodiment describes a service vehicle for accommodating one or more pieces of autonomous outdoor power equipment. The service vehicle includes a loading/unloading elevator system, a loading/unloading ramp, one or more charging terminals and a controller. The charging terminals are configured to charge a rechargeable battery of the one or more pieces of autonomous outdoor power equipment. The controller includes a user interface, a communication interface, and a processing circuit, and is configured to control one or more functions of the service vehicle.

Another embodiment describes a system for providing autonomous lawn care services. The system includes a number of autonomous outdoor power devices, and one or more service vehicles. The one or more service vehicles are configured to selectively load and unload one or more of the autonomous outdoor power devices at a jobsite based on instructions received by a controller of the one or more service vehicles.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 10 is a system view illustrating a lawn care service dispatching and recovering a number of autonomous lawn are devices to multiple lawns.

DETAILED DESCRIPTION

The present disclosure is directed to autonomous powered lawn care equipment for use with maintaining a yard or other outdoor area. The figures depict autonomous lawn cutting devices, service vehicles, and processes. However, it should be understood that the autonomous lawn care device could be configured to function as other types of outdoor power equipment such as with thatchers, edge trimmers, seeders, sprayers, snow throwers, sod cutters, power rakes, overseeders, aerators, sod cutters, brush mowers, spreaders, etc.

The present disclosure relates to systems and devices for performing automated lawn care, including functions such as mowing, edging, trimming, etc. The lawn care may be performed by one or more automated devices which can work either individually or in groups to complete one or more lawn care functions. Further, the autonomous devices may be operated as a system and controlled from a central station or control vehicle to allow for multiple lawns to be serviced in a given period of time.

Presently, most commercial lawn care services utilize individual workers operating multiple types of outdoor power equipment (e.g. zero-turn mowers, string trimmers, edgers, thatchers, sprayers, seeders, and the like) at a given worksite. This results in multiple workers being needed, which increases the cost to the commercial lawn care service, and therefore the end customer. While some commercial lawn care services have attempted to use automated equipment, current automated equipment either requires a gasoline, or other fossil fuel based engine, to operate. Generally, fossil fuel based engines require supervision of the device during operation. Other commercial lawn care services may utilize electrical (e.g. battery) powered devices. However, current electronic units often do not have the capacity (e.g. battery life) to complete a job at a given job site, let alone multiple job sites throughout the day. Further, current electronic units must be recharged before they can be used again, which can be time consuming, resulting in inefficiencies for the commercial lawn care service. Further, these current electronic units do not provide communications and status information to the commercial lawn care service, thus requiring human interaction at the job sites to monitor and maintain the electronic units. The current disclosure describes autonomous lawn care devices which can communicate with the lawn care service provider. The autonomous lawn care devices described herein further have increased battery life, as well as an ability to replace the batteries easily to allow for the autonomous lawn care devices to continue to operate without requiring downtime to charge a non-replaceable power source.

Figure 1:
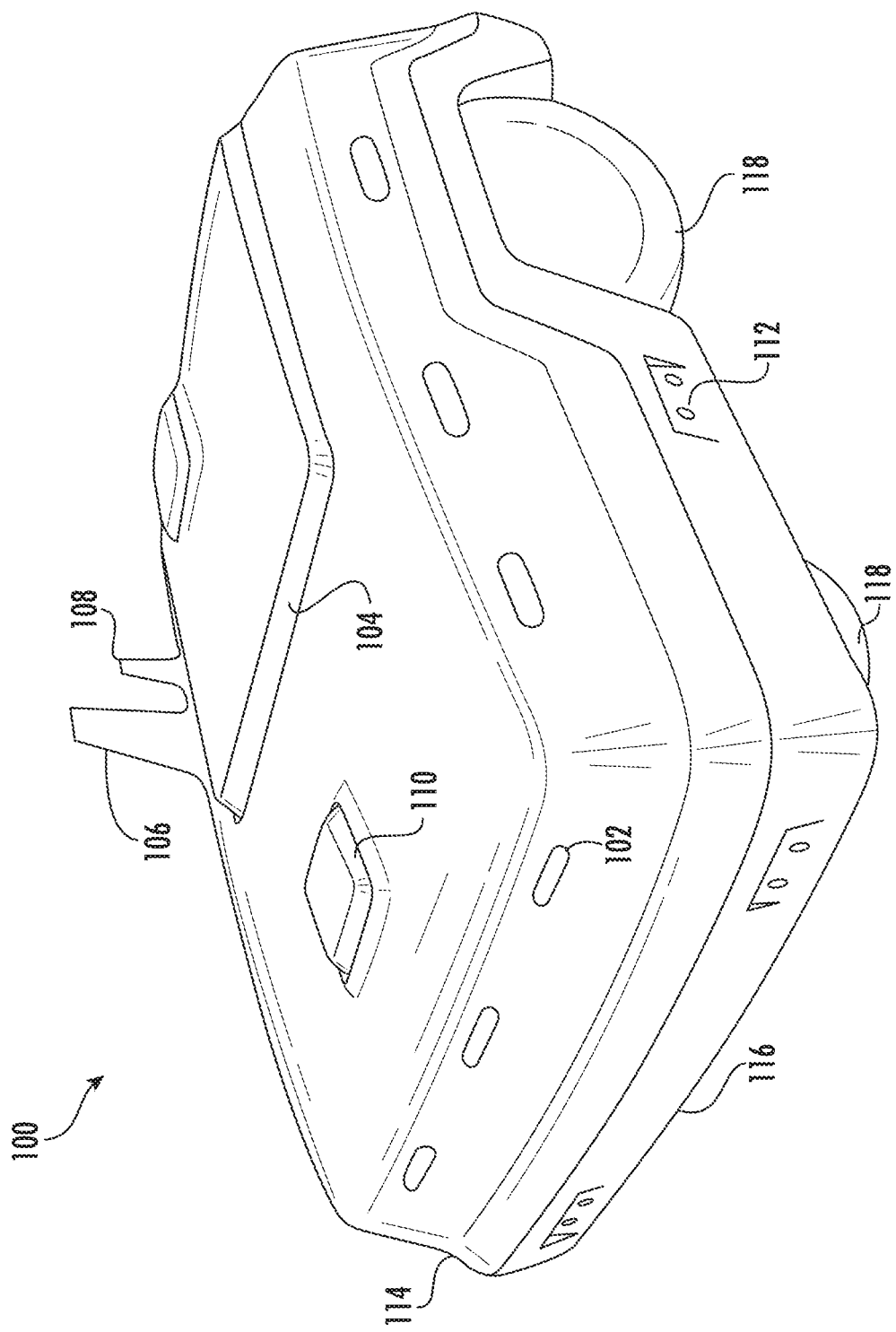
FIG. 1 is a front perspective view of an autonomous lawn care device, according to some embodiments.

FIG. 1 illustrates an autonomous lawn care device in the form of an autonomous lawn mower 100. While the autonomous lawn care device is shown as mower 100, it is contemplated that the lawn care device can also be operated as other lawn care devices, such as those described above. In some embodiments, the autonomous lawn mower 100 may be similar to the robotic lawnmower as described in United States Patent Application No. PCT US 2017/063583, which is hereby incorporated by reference in its entirety herein.

The autonomous lawn mower 100 may include sensors 102, one or more removable batteries 104, a communication antenna 106, one or more locating antennas 108, a visual beacon 110, and one or more attachment points 112. In some embodiments, the autonomous lawn mower 100 is gas-powered. In some embodiments, the autonomous lawn mower 100 can use a hybrid power solution, such as a combination of gas-powered and battery powered. The autonomous lawn mower 100 may further include an upper frame 114, a lower frame 116, and a number of wheels 118. While not shown in FIG. 1, the lawn mower 100 may also include operating lights, a user interface (e.g., user interface 408 shown in FIG. 4), one or more blades or other implements, a clippings ejection chute, one or more electric motors to provide a traction drive and/or rotational drive power to the blades or other implements.

In one embodiment, the battery 104 is a removable battery pack. In some embodiments, the battery 104 may be a rechargeable battery, such as a Li-ion battery. However, other battery types, such as NiCd, lead-acid, Nickel-Metal Hydride (NiMH), or Lithium Polymer, are also contemplated. As described above, the battery 104 may be a lithium-ion battery comprising multiple Li-ion cells arranged in a variety of series (S) and parallel (P) configurations. In one configuration, the battery 104 includes seventy-eight cells. Each cell is rated at 3.6 volts and 2.5 amp-hours. The battery 104, in one configuration, arranges the cells in a 13S6P configuration with 13 cells connected in series in a group and six groups of cells connected in parallel. The series configuration yields a system voltage of 46.8 volts for the battery 104. The six parallel cell configuration yields fifteen amp-hours capacity for the battery 104. The combination of the two provides 702 watt-hours energy capacity for the battery 104.

In some embodiments, the battery 104 has the cells arranged in multiple layers. For a 13S6P configuration battery 104, each layer includes cells arranged in six groups and the battery 104 includes two layers of cells.

In an alternative embodiment, the cells are arranged in a single layer with six groups of thirteen cells each. In an application using four of the 13S6P configuration batteries 104, the total energy capacity would be 2808 watt-hours (2.8 kilowatt-hours). In this embodiment, the battery 104 weighs about 10.75 pounds and is substantially shaped like a cube.

In another configuration, the battery 104 includes eighty-four cells arranged in a 14S6P configuration. Using cells rated at 3.6 volts and 2.5 amp-hours, this configuration yields a voltage of 50.4 volts, 15 amp-hours of capacity, and 756 watt-hours of energy capacity. In other embodiments using cells rated at 3.9 volts and 2.5 amp-hours, the 13S6P arrangement would yield a voltage of 50.7 volts, 15 amp-hours of capacity, and 760.5 watt-hours of energy. In the 14S6P configuration, the voltage would be 54.6 volts, 15 amp-hours of capacity, and 819 watt-hours of energy.

In another configuration, the battery 104 includes one hundred cells arranged in a 20S5P configuration having five groups of twenty cells each. Each group or row of twenty cells is welded or otherwise connected together in series (e.g., by conductors 116), and each of the five groups of twenty cells is welded or connected together in parallel (e.g., by conductors). The cells used in the battery 104 may be 18650 form factor cylindrical cells (18 millimeter diameter and 65 millimeter length). In other configurations, the cells used in the battery 104 may be 21700 form factor cylindrical cells. These cells may be available in 3.2 amp hours, 2.9 amp-hours, 2.5 amp-hours, and other cell ratings. Using cells rated at 3.6 volts, and 3.2 amp-hours, a 20S5P configuration battery 104 provides a voltage of 72 volts, 16 amp hours of capacity, and 1152 watt-hours of energy. Using cells rated at 3.6 volts, and 2.9 amp hours, a 20S5P configuration battery module provides a voltage of 72 volts, 14.5 amp-hours of capacity, and 1044 watt-hours of energy. Using cells rated at 3.6 volts and 2.5 amp-hours, a 20S5P configuration battery pack provides a voltage of 72 volts, 12.5 amp-hours of capacity, and 900 watt-hours of energy.

In some embodiments, the battery 104 provides about one kilowatt-hour of energy (e.g., between 800 watt-hours and 1.2 kilowatt-hours) and weighs less than twenty pounds. Because the battery 104 may need to be changed in the field, the battery 104 needs to be of a manageable size and weight for the end user to lift, carry, install, remove, etc., so that the battery 104 is configured to provide manual portability for the user. The battery 104 is configured to be small enough, light enough, and graspable enough to allow the battery 104 to be manually portable by the user. The user does not need a lift, cart, or other carrying device to move the battery 104. Also, end products powered by the battery 104 generally scale in increments that can be measured in kilowatt-hours of energy. For example, a standard residential lawn tractor may require between two and three kilowatt-hours of energy capacity and a premium residential lawn tractor may require between three and four kilowatt-hours of energy capacity. Batteries 104 that provide about one kilowatt-hour of energy and weigh less than twenty pounds allow the end user to easily choose between a standard configuration and premium configuration of the lawn tractor or other end product by providing a reasonable number of battery modules to achieve either configuration and battery modules of a size and weight that can be easily manipulated as needed by the end user. The battery 104 may be interchangeable between different pieces of equipment (e.g., between a lawn tractor, a vehicle, a backup power supply, a stand-alone power supply, a portable generator, and a trolling motor).

Figure 2:
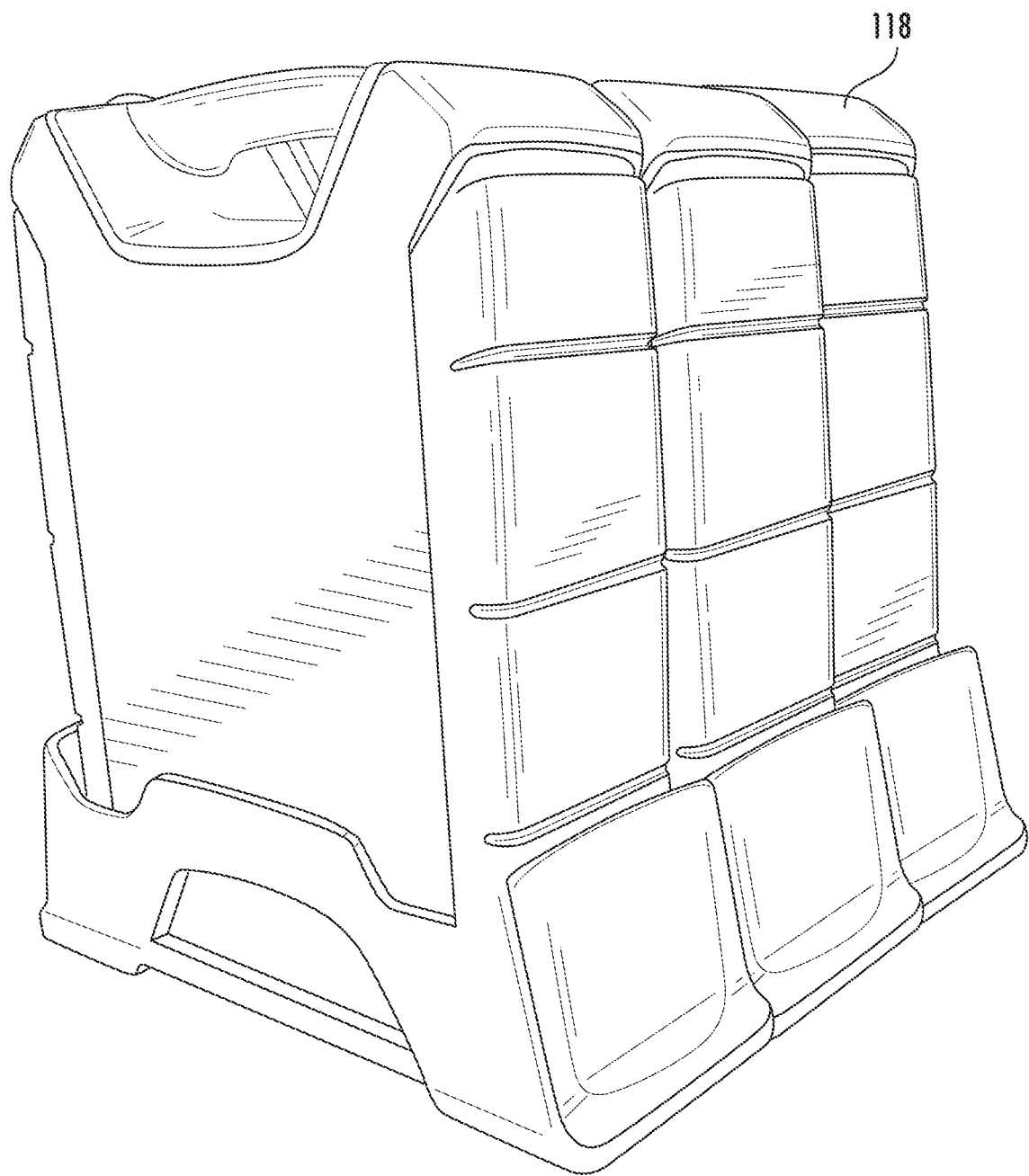
FIG. 2 is a perspective view of a first battery pack according to some embodiments.

The batteries 104 shown in FIG. 2 have a weight of approximately 13-15 pounds. In the embodiment illustrated, the batteries are each 1 kW battery packs. However, it is contemplated that different sized batteries could be utilized while operating within the scope of the present disclosure. In the embodiment shown in FIG. 2, each of the batteries 104 has the same physical size and electrical capacity. However, it is also contemplated that different types of battery packs, such as the physically smaller batteries, could be utilized in place of the batteries 104 or along with one or more of the batteries 104.

Figure 3:
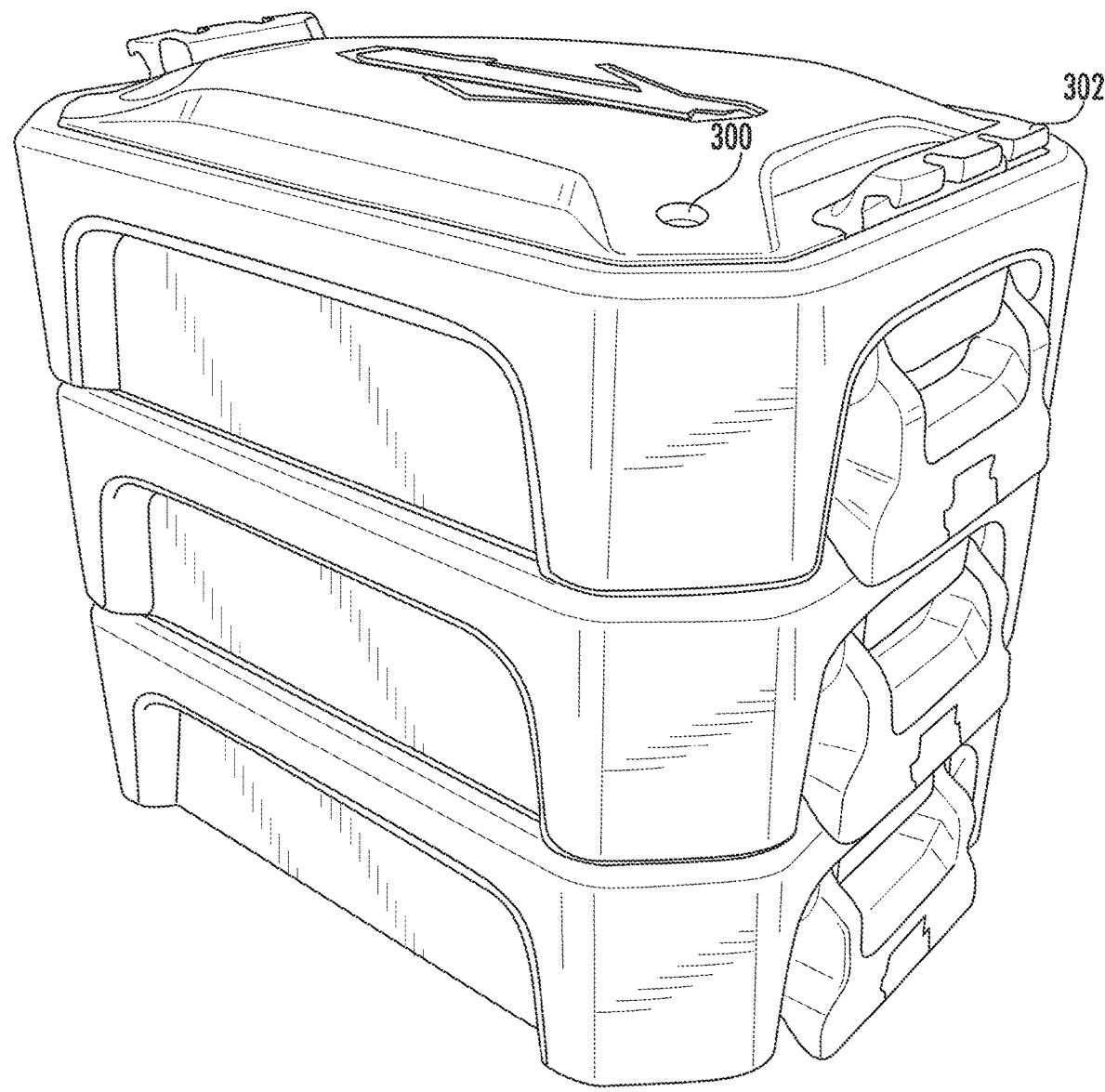
FIG. 3 is a perspective view of a second battery pack according to some embodiments.

The batteries 104 of FIG. 3 include outer casings 300 having a locking handle 302 that allows the individual battery packs to be locked together to form a stack as shown in FIG. 3. The locking handles may further be used to secure the battery 104 in a receptacle on the autonomous lawn mower 100. Thus, a user may be able to remove the battery 104 from the autonomous lawn mower 100 without a tool by actuating the locking handle on the battery 104. The batteries 104 shown in FIG. 3 may be configured as described above.

Returning now to FIG. 1, the sensors 102 on the autonomous lawn mower 100 may be positioned around the autonomous lawn mower 100 as shown, as well as in other locations as needed for a given configuration. The sensors 102 may be all of the same type, or may be a combination of different sensor types. Sensors may include object detection sensors, such as infrared (IR), LIDAR, RADAR, Time-of-Flight (ToF), CCD, CMOS, Ultrasonic, Sonar, or other sensors configured to detect objects. The visual sensors may be used to detect objects, to map a lawn, or to assist in guidance of the autonomous lawn mower 100. Further sensors may include moisture sensors, rain sensors, air quality sensors, magnetic field sensors (e.g. compass), temperature sensors, digital imaging sensors, motion detection sensors, rotation sensors, gyroscopes, chemical detection sensors, and the like. In some embodiments, the sensors 102 are coupled to a controller (e.g., controller 400 shown in FIG. 4) contained within the automated lawn mower 100, and used to provide data to the controller, which can process the data to perform functions as will be described in more detail below. The sensors may further include weed sensing sensors, which can provide a count of weeds that are detected on a given lawn.

The communications antenna 106 may be configured to communicate with one or more other devices. In some embodiments, the communications antenna is configured to communicate using a wireless communication protocol, including but not limited to, Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols. In some embodiments, the communications antenna 106 may communicate with a homeowner's network (e.g. via Wi-Fi). In some embodiments, the communications antenna 106 may communicate with the homeowner's network to access a central server, such as a cloud based server, as will be described in more detail. In other embodiments, the communications antenna 106 may communicate with a local communications hub or bridge, such as a communications hub associated with a service vehicle. In still other embodiments, the communications antenna 106 may be configured to allow for the autonomous lawn mower 100 to communicate directly with a central or cloud-based server (e.g. via a cellular connection). In some embodiments, the communications antenna 106 may be used to communicate with a user device capable of remotely controlling the autonomous lawn mower 100. Example user devices capable of remotely controlling the autonomous lawn mower 100 may include dedicated remote controls, smart phones, tablet computers, laptop computers, or any other user device capable of interfacing with the communication antenna 106.

The locating antenna 108 may be configured to provide location data to the controller of the autonomous lawn mower 100. In some embodiments, the locating antenna 108 may be a Global Positioning Satellite (GPS) antenna for receiving locations data from a number of GPS satellites. In other embodiments, the locating antenna 108 may be configured to receive one or more differential GPS signals for determining a location of the autonomous lawn mower 100. In still other embodiments, the locating antenna 108 may be configured to receive one or more inputs from a local positioning system. For example, the locating antenna 108 may be configured to receive data from an installed boundary system (such as a buried cable, or placed transmitters). Additional local positioning data may come from an aerial transmitter, such as on a roof top or a drone. Further local positioning data may include optical boundary data, magnetic boundary data, etc. In still further embodiments, the locating antenna 108 may relay data to other autonomous lawn mowers, or supervisory controllers to allow for a position of the autonomous lawn mower 100 to be monitored. However, in some embodiments, the location data of the autonomous lawn mower 100 may be communicated via the communications antenna 106.

The visual beacon 110 may be configured to provide an indication that the autonomous lawn mower 100 is operating. For example, the visual beacon 110 may illuminate with a first color or pattern when the autonomous lawn mower 100 is moving, but the implements are not being powered. The visual beacon 110 may then provide a different color illumination or illumination pattern when the autonomous lawn mower 100 is actively operating (e.g. the implements are being powered). In some embodiments, the visual beacon 110 may be configured to provide information to a user, such as flashing in one or more patterns to indicate one or more failure codes. In still further embodiments, the visual beacon 110 may provide an alert that there is a warning or alert, such as low battery, over-tilt, or that it is "stuck" (e.g. can no longer move as required). The visual beacon 110 can also provide a location of the device when it is operating in low light conditions, such as at night or when there is an overcast sky.

The attachment points 112 may be used to attach one more implements, control modules, communication modules, and the like to the autonomous lawn mower 100. For example, work implements, such as edgers, string trimmers, torches, sprayers, chemical dispensers, snow blowers, power rakes, sod cutters, leaf blowers, leaf bailers, paint/marking dispensers, etc., may be coupled to the attachment points 112. In some embodiments, the attachment points may provide a power and ground connection, as well as a communication connection to the controller of the autonomous lawn mower 100. The attachment points 112 may also be used to attach additional sensors to the autonomous lawn mower 100. Additional attachments may include other communication modules to allow for communication with different protocols, additional beacons or illumination devices, location device, and the like.

Figure 4:
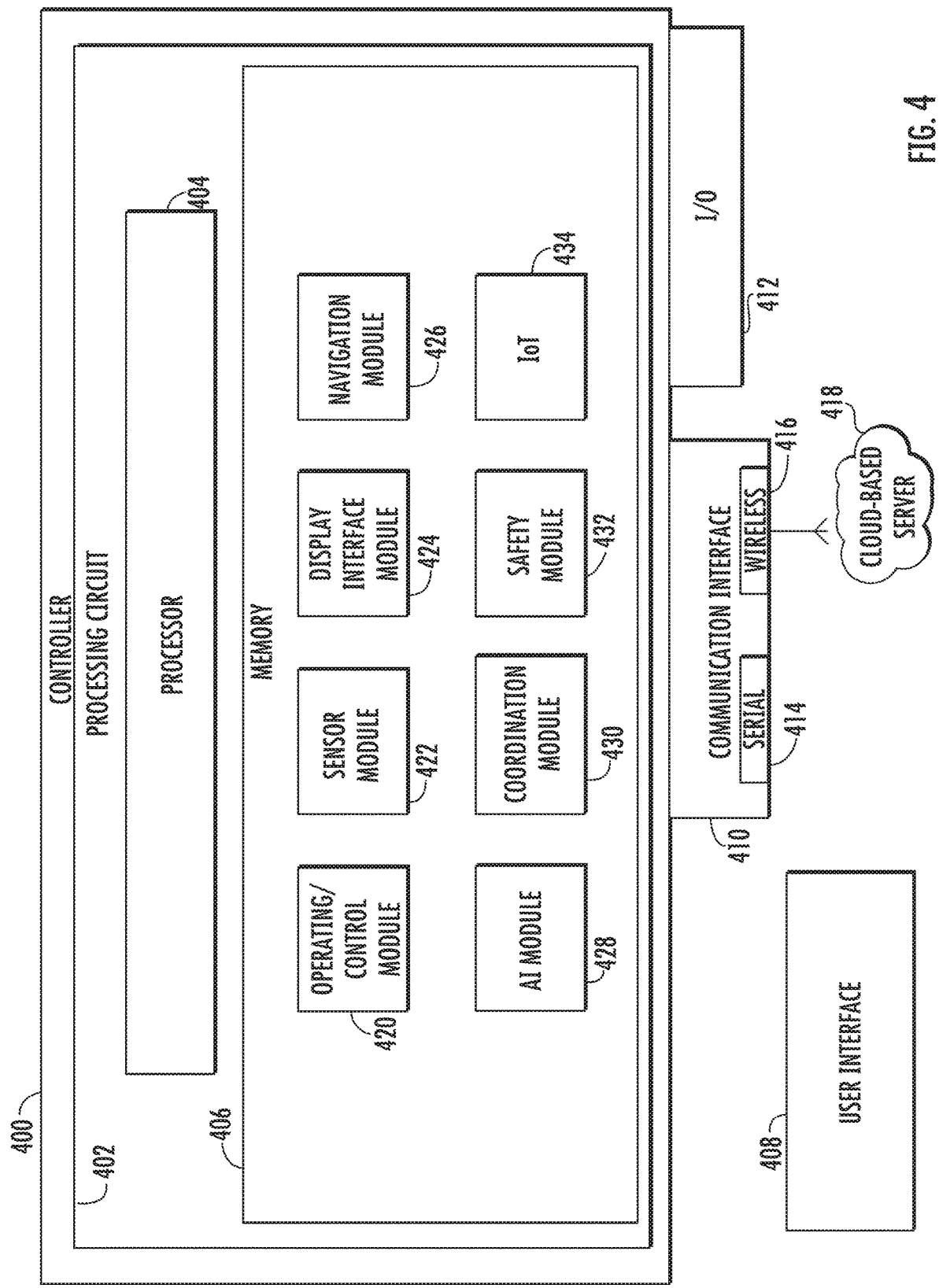
FIG. 4 is an electrical schematic illustration of a controller of the autonomous lawn care device according to some embodiments.

Turning now to FIG. 4, a block diagram illustrating a controller 400 associated with the autonomous lawn mower 100 is shown, according to some embodiments. The controller 400 may include a processing circuit 402. The processing circuit 402 may include a processor 404 and a memory 406. The processor 404 may be general purpose or specific purpose processor, an application specific integrated circuit (ASIC), one or more field programmable gate arrays (FPGAs), a group of processing components (e.g. parallel processing units), a neural network processing system, or other applicable processing circuits. The processor 404 may be configured to execute computer code or instructions stored in the memory 406 or received from other computer readable media, such as physical media (e.g. CD-ROM, DVD-Rom, flash drive, etc.), network drives, remote servers, mobile devices, etc. The memory 406 may include one or more devices (e.g. memory units, memory devices, storage devices, etc.) for storing data and/or computer code for completing and/or facilitating the functions and processes described in the present disclosure. The memory 406 may include random access memory (RAM), read-only memory (ROM) hard drive storage (physical or solid state), temporary storage, non-volatile memory, flash memory, optical memory, or any other suitable memory component for storing software objects and/or computer instructions. The memory 406 may include database components, object code components, script components, or any other type of information structure for supporting the various functions and information structures described in the present disclosure. The memory 406 may be communicably connected to the processor via the processing circuit and may include computer code for executing (e.g. by the processor) one or more processes described herein.

The controller 400 may further be in communication with a user interface 408 associated with the autonomous lawn mower 100 and/or associated with a user device separate from the autonomous lawn mower 100. The controller 400 may further include a communication interface 410 and an input/output (I/O) interface 412. The communication interface 410 may include a serial interface 414 and a wireless interface 416. The wireless interface 416 may be in communication with the communications antenna 106 and/or the locating antenna 108.

In one embodiment, the wireless communication interface 416 may be integrated into the controller 400 or via a separate communication module. In some embodiments, the wireless communication interface 416 may be configured to communicate using one or more wireless protocols. For example, the wireless communication interface 416 may utilize wireless protocols including Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoW-PAN, Thread, RFID, and other applicable wireless protocols. In some embodiments, the wireless communication interface 416 may be in communication with a cloud-based server 418. The cloud-based server 418 may be configured to interface with multiple programs and interfaces, and be accessible via the world wide web (e.g. the Internet). This can allow a user to access the controller 400 (and therefore the autonomous lawn mower 100) via any device that has access to the world wide web. For example, a user may be able to access the controller 400 via a mobile device such as an internet connected computer, a smartphone (e.g. iPhone, Android phone, Windows phone), a tablet computer (e.g. iPad, Android Table, Microsoft Surface, etc.), or any other internet connected device. In some embodiments, the cloud-based server 418 may provide one or more web-based applications for interfacing between a user device and the controller 400, and thereby the associated outdoor power equipment. In other embodiments, the user device may include a client-side application, which can interface with the controller 400 via the cloud-server 418. In still further embodiments, the user device may include one or more client-side applications which can be configured to communicate directly to the controller 400 via the wireless communication interface 416, such as via Bluetooth, BLE, NFC, Zigbee, etc.

The serial communication interface 414 may utilize multiple serial communication protocols and/or hardware, including universal asynchronous receiver-transmitter (UART) communication, a serial peripheral interface bus (SPI), including MOSI, MISO, SCK, CS, and I2C, serial data lines (SDA), serial clock lines (SCL), universal serial bus (USB), RS-232, k-line, CAN, and the like. The I/O interface may be configured to provide communication between the controller 400 to one or systems, subsystems or components on the autonomous lawn mower 100. For example, the I/O module 412 may interface with one or more of the sensors 102, the visual beacon 110, the battery 104, one or more electric motors on the autonomous lawn mower 100, or any other applicable systems. The I/O may be digital, analog, or a combination thereof.

As described above, the memory 406 may include one or more modules, scripts or programs for the processor 404 to execute. In some configurations, the memory 406 may include an operating/control module 420, a sensor module 422, a display interface 420, a navigation module 426, an artificial intelligence (AI) module 424, a coordination module 430, a safety module 432, and an internet of things (IoT) module 434. Further, it is contemplated that additional modules may be installed on or in the memory 406 to configure the controller 400 to control and/or implement additional functions over time. For example, additional modules may be installed to control implements that are designed to attach to the autonomous lawn mower 100. Further, while the following functions are described as being performed by a discrete module, it is contemplated that one or more modules may be involved in performing certain functions. Further, in some configurations, some modules may be configured to perform the functions associated with one of the other modules described below.

The operating/control module 420 may be configured to control one or more aspects of the autonomous lawn mower 100, including, but not limited to, direction control, speed control, implement control, etc. In some configurations, the operating/control module 420 may control the speed and direction of the autonomous lawn mower 100 based on data received from the sensor module 422, the navigation module 426, the (artificial intelligence) AI module 428, the coordination module 430, the safety module 432, and/or the IoT module 434, as will be described in more detail below. The operating/control module 420 may be in communication with one or more electric motors used for controlling the wheels and or implements. For example, the operating/control module may interface with the motors via the I/O module 412, which may provide power control to the motors. In other embodiments, the operating/control module 420 may interface with the visual beacons 110 to provide an indication to a user as described above. Example indications may include operating indications, directional indicators, error indications, etc.

The operating/control module 420 may also be configured to control one or more attachments attached to the automated lawn mower 100. In some embodiments, the attachments may be coupled to the automated lawn mower 100 via attachment points 112 described above. The operating/control module 420 may interface with the attachments via the attachment points 112. Example interfaces may include power and/or control and communication signals. In some embodiments, the operating/control module 420 may be configured to automatically determine when an attachment has been attached to an attachment point 112. In some embodiments, the operating/control module 420 may detect a new attachment has been attached, and install additional software (e.g. drivers, firmware, applications, etc.), which can allow the operating/control module 420 to obtain the required instructions for a given attachment. In some embodiments, the operating/control module 420 may download the additional software from the cloud-based server 418. The attachments may be similar to the attachments described above.

The operating/control module 420 may further be configured to operate the autonomous lawn mower 100 in various pre-programmed ways, based on user input. For example, the operating/control module 420 may be configured to cut a lawn using a specified pattern. For example, the autonomous lawn mower 100 may be instructed to cut a lawn using a pattern such as striping (horizontal, vertical, angled, checkerboard, etc.), or a custom patterning scheme. The operating/control module 420 may be able to control the intensity of the pattern contrasts. In further embodiments, the operating/control module 420 may be configured to cut images or text into a yard based on user input. The operating/control module 420 may interface with the navigation module 426 to properly cut the desired patterns in a given yard.

In some embodiments, the operating/control module 420 may be able to control a height of cut by the autonomous lawn mower 100. In some configurations, the operating/control module 420 may control one or more motors or actuators coupled to the implements (e.g. blades), which can control an elevation of the implements. In other embodiments, the operating/control module 420 may control one or more actuators coupled to the implements to change a pitch or angle of the implements during operation. In still further embodiments, the operating/control module 420 may be configured to control one or more motors or actuators configured to adjust a height of the wheels 118, which in turn controls a height of cut by the autonomous lawn mower 100. In still further embodiments, the operating/control module 420 can be configured to operate various components (e.g. motors, actuators, transmissions, relays, switches) associated with the autonomous lawn mower 100 as required.

In some embodiments, the operating/control module 420 may further be configured to determine the presence of an incline, slope, or hill and increase or decrease operation of one or more motors of the autonomous lawn mower 100 based on the incline information. The incline circuit is configured to control the mower 100 to drive in a straight line even when operating on sloped ground. For example, if the mower 100 is driving along the side of a hill (e.g., if the lawn of an operator is sloped and an operator is attempting to cut the grass of the lawn in a straight line), correction may be required to cause the mower 100 to drive in a straight line. The operating control module 420 may be configured to receive accelerometer data and/or gyroscope data from an accelerometer and/or gyroscope. If it is determined that the mower 100 is descending a hill, the sensitivity of object detection/sensing may be decreased such that the mower 100 does not inadvertently detect the approaching flat ground as an object in the way of the mower 100.

The data received from an angle sensing device (e.g., the accelerometer and/or gyroscope) may be indicative of a roll of the mower 100. In this regard, the operating/control module 420 can determine whether the roll is greater than a predefined amount and whether line correction is necessary. In response to determining that the roll is greater than a predefined amount and/or based on the polarity of the roll (whether the autonomous lawn mower 100 is rolling clockwise or counterclockwise) the incline circuit can be configured to operate one or more drive wheels to keep the autonomous lawn mower 100 driving in a straight line. For example, if the autonomous lawn mower 100 is in a roll to the right, the right wheel speed may be a particular amount greater than the left wheel speed. The right wheel speed and/or the left wheel speed may be based on an operator directed drive speed and a magnitude of the roll. Similarly, if the autonomous lawn mower 100 is in a roll to the left, the left wheel may be driven at a higher speed than the right wheel to keep the autonomous lawn mower 100 driving in a straight line.

In some embodiments, various amounts of roll may indicate that the autonomous lawn mower 100 is being operated in a dangerous manner. For example, it may be dangerous for the mower 100 to be riding on a sharp incline since there may be the chance that the mower 100 rolls or flips over and exposes the blades. In this regard, the operating/control module 420 can determine whether the mower 100 is in danger by determining whether a roll angle is greater than a first predefined amount. In response to determining that the roll angle is greater than the first predefined amount, the operating/control module 420 can turn off chore motors (or cause the motor controllers to turn off chore motors). However, the operating/control module 420 may continue to operate the drive motors so that the operator of the mower 100 can correct the dangerous situation. If the operating/control module 420 determines that the roll angle is greater than both the first predefined and a second predefined amount greater than the first predefined amount, this may indicate that the mower 100 is flipping or rolling, has flipped or rolled, or is very likely to flip or roll. In this regard, the operating/control module 420 can be configured to shut down all motors and/or apply braking devices.

The operating/control module 420 may also be configured to detect a deviation from the desired direction of travel or from the desired path and modulate the power delivered to each wheel in order to modify the course and/or eliminate any wheel slippage. Using heading information from the gyroscope or wheel slip information from the optical encoders and GPS the operating/control mode 420 detects a situation where the lawn mower 100 may be encountering a slope or angled ground. As conventional electric lawn mowers drive, the charge on their fixed batteries continuously decreases, resulting in a continuous decrease in the maximum grade of hill they can scale. The operating/control module 420 can cause the battery system to selectively draw power from one or more different battery modules, and because of this the autonomous lawn mower 100 can climb steep hills, even after long periods of operation. For example, the operating/control module 420 could save one fully charged battery module while driving on level ground and use it when it encounters a steeper slope. The operating/control module 420 may be configured to draw from this reserve battery module when the controller 400 determines (e.g., using information from a gyroscope or from a location sensor) that the lawn mower 100 has deviated from the desired direction of travel along a desired path by at least a threshold angle. Alternatively, the operating/control module 420 may be configured to draw from this reserve battery module when the controller 400 determines (e.g., using information from the gyroscope) that the orientation of a lawn mower is within a predetermined range (e.g., indicative of a slope having at least a threshold grade).

In some embodiments, the operating/control module 420 includes a hybrid management circuit. The hybrid management circuit can be configured to operate a hybrid device (where the autonomous outdoor power equipment is a hybrid device that runs on both a gas engine and a motor with one or more batteries). The hybrid management circuit can receive an indication of the voltage or state of charge (SoC) of the one or more batteries and can be configured to operate a throttle of the gas engine based on the measurement. The hybrid management circuit can be configured to distribute power in a power train of the hybrid system and/or can be configured to operate switching mechanisms causing the one or more batteries to charge and/or discharge in order to use a low (or minimal) amount of gas power.

The sensor module 422 may be configured to communicate with the number of sensors 102 described above. The sensor module 422 may further be configured to collect data from multiple sensors 102, process the data, and subsequently provide the processed data to other modules as needed, such as the operating/control module 420. In one configuration, the sensor module 422 may receive sensor data indicating the presence of an obstacle or other obstructions. The sensor module 422 may be able to determine if the obstacle or obstruction are fixed or moving. For example, the sensor module 422 may be able to distinguish between a tree or rock in the path of the autonomous lawn mower 100 and a moving obstacle such as a child or pet in the path of the autonomous lawn mower 100. This information can be provided to other modules such as the operating/control module 420, the safety module 432, and/or the navigation module 426.

In other configurations, the sensor module 422 may be able to determine a fault or error condition of the autonomous lawn mower 100 based on received sensor data. For example, sensor data from sensors such as motion detection sensors, visual sensors, rotation sensors, and gyroscopes may be analyzed by the sensor module 422 to determine that the autonomous lawn mower 100 is improperly positioned. For example, the autonomous lawn mower may be stuck at an improper angle, upside down, etc. The sensor module 422 may then provide a fault indication to one or more other modules to inform an operator that there is an issue with the autonomous lawn mower 100.

The sensor module 422 may further be configured to determine other conditions based on data provided by the sensors 102. For example, air quality sensors, temperature sensors, and moisture sensors may provide information related to the quality of the lawn being cut. For example, the sensor data may allow the sensor module 422 to determine if the lawn is dry, wet, etc. Based on this analysis, one or more other software modules may determine that cutting parameters or cutting times may need to be changed to ensure optimal lawn care. In some embodiments, the sensor module may receive data from a chemical detection sensor which can determine a level of chemical on the lawn being cut. Based on this data, it can be determined whether an additional chemical is needed, or if the application of a certain chemical should be reduced. The sensor module 422 may further be configured to process sensor data from other sensors to aid in the operation of various functions of the autonomous lawn mower 100, as described above.

Figure 5:
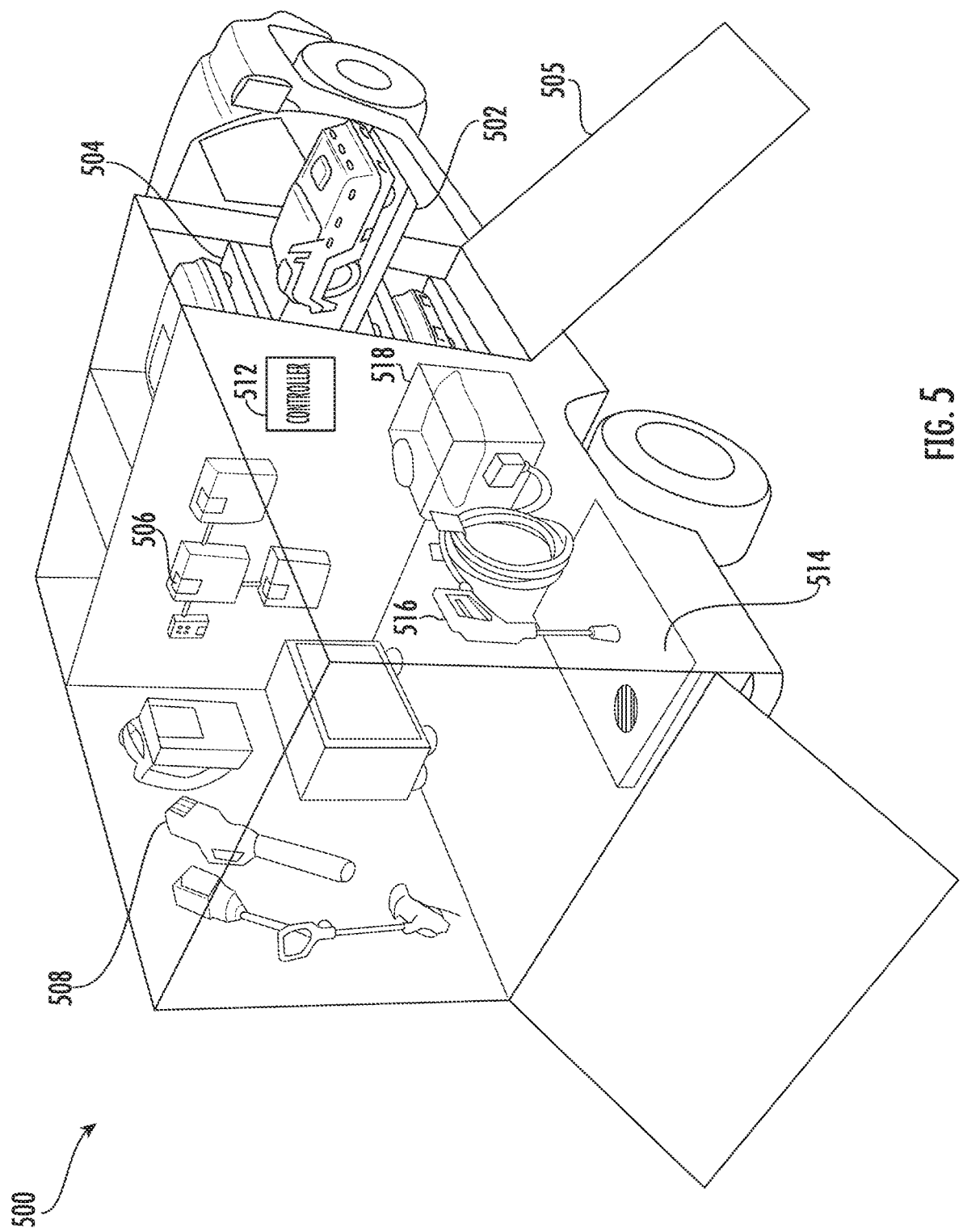
FIG. 5 is a perspective view of a service vehicle associated with the autonomous lawn care device of FIG. 1, according to some embodiments.

The display interface module 424 may be configured to control the user interface 408 associated with the autonomous lawn mower 100 and/or a separate user device (e.g., tablet, mobile device, laptop, etc.). The user interface 408 displays information to the user and receive control inputs from the user. In some embodiments, the user interface 408 includes a display screen and one or more user input devices (e.g., switches, buttons, key-switches, dials, etc.). In some embodiments, the display screen is a touch screen display that both displays information to the user and receives user inputs. In some embodiments, the user interface 408 includes an application installed onto a computer, smartphone, tablet, or other device. Such a device may connect to the controller 400 through a wired connection or through a wireless connection (e.g., Bluetooth, Wi-Fi, infrared, etc.). In some embodiments, the user interface 408 provides the user with information related to the operation of the autonomous lawn mower 100. By way of example, the user interface 408 may indicate the state of charge of the battery 104, the run time provided by the battery 104, or the current status of the autonomous lawn mower 100 (e.g., operating, charging, etc.) or alert the user if the autonomous lawn mower 100 needs maintenance (e.g., by displaying faults) or needs user intervention in the event of being stuck, etc. The user interface 408 can also display the amount of time until completion of a jobsite to the user, current return on investment information for a mower 100, etc. The user interface 408 can also receive inputs from the user to control the autonomous lawn mower 100. By way of example, the user interface 408 may allow the user to select between various cutting heights, issue run and stop commands, develop a schedule for when the autonomous lawn mower 100 will operate, or to tell the autonomous lawn mower 100 to return to a battery storage/charging station 506 (FIG. 5).

In some configurations, the display interface module 424 may receive data from one or more of the other software modules in the memory 406. The display interface module may further receive input directly from the user interface 408 where the user interface 408 includes an input mechanism to allow a user to input information directly into the user interface 408 as noted above. The display interface module 424 may be configured to process any inputs provided by the user. The display interface module 424 may then transmit the processed data to other modules as required. For example, a user may provide an input to set a cut height of the autonomous lawn mower 100, which is transmitted to the display interface module 424, and then provides the instructions to the operating/control module 420 to adjust the cut height as described above. Further, the display interface module 424 may be configured to receive data from one or more of the software modules and then display the data provided to the display interface module 424 on the user interface 408.

The navigation module 426 may be configured to control the navigation of the autonomous lawn mower 100. In some embodiments, the navigation module 426 communicates navigation instructions to the operating/control module 420, which can then control the autonomous lawn mower 100 to proceed as required by the navigation module 426. In some configurations, the navigation module 426 may be in communication with the locating antenna 108 and/or the communication antenna 106 for receiving location data. The navigation module 426 may also be in communication with one or more sensors 102 to determine a location of the autonomous lawn mower 100. In some embodiments, the navigation module 426 may receive location data, such as GPS data, via the locating antenna 108. Alternatively, or in conjunction with the locating antenna 108 data, the navigation module 426 may obtain location data from the sensors 102. For example, the sensors 102 may be visual sensors and visually provide location data to the navigation module 426. The navigation module 426 may then compare the received visual location data received from the sensors 102 to previously obtained image data for a given job site. In some embodiments, the navigation module 426 may access the previously obtained image data via the cloud-based server 418. The image data may have been captured by various methods, including visual recordings by the autonomous lawn mower 100, a user, a drone, satellite imagery, and the like. In still further configurations, the sensors 102 may also provide other location data, such as a magnetic or electric field signal. The magnetic or electric field signal may represent a proximity of the autonomous lawn mower 100 to a boundary indicator such as a buried wire. In other examples, the sensors 102 may provide boundary data provided by light-based (e.g. lasers, IR) boundary indicators.

In some embodiments, the navigation module 426 may receive instructions regarding a specific pattern or path that is desired of the autonomous lawn mower 100. The navigation module 426 may receive the instructions via the user interface 408 and/or via the communication interface 410. In some configurations, the navigation module 426 may receive the instructions via the cloud-based server 418. For example, a user may be able to generate a specific pattern using a landscaping or other applicable program. The pattern may then be communicated to the processing circuit 402. The navigation module 426 may then create a navigation path for the autonomous lawn mower 100 to create the desired pattern. The navigation module 426 may then interface with the operating/control module 420 to execute the desired pattern.

In some embodiments, the navigation module 426 may have a training mode that allows a user to teach a boundary path for the autonomous lawn mower 100. For example, the user may attach a manual push handle to the autonomous lawn mower (such as via the attachment points 112) and push the autonomous lawn mower 100 along the boundary of the operating area (e.g. the portion of the lawn to be cut). The navigation module 426 may then store the boundary for use with the specific lawn or jobsite. In still other embodiments, the user may walk the outline of the boundary and the autonomous lawn mower 100 may follow via the user by utilizing one or more sensors 102. The navigation module 426 may then generate the boundary area based on the path of the user. In still other embodiments, the user may place one or more visual markers or indicators along the boundary of the lawn or jobsite which can be detected by the sensors 102 during an initial scan of the lawn or jobsite. The navigation module 426 may then generate a boundary map based on the provided visual markers/indicators. Visual markers or indicators can include flags, colored paint, rope, string, laser patterns, etc. Other boundary indicators, such as chemical boundaries, ultrasonic boundaries, RFID boundaries (e.g. via RFID transmitters attached to various points of the job site), gravity sensors, non-harmful radioactive material, etc. may also be used and sensed via the one or more sensors 102 for establishing a boundary for a given lawn or jobsite, and stored in memory 406 or the cloud based server 418. In some instances, a mesh of boundary material (e.g. metallic mesh) may be installed when new sod is placed, or during new construction, which may further be used as a boundary indicator for the autonomous lawn mower 100. Other boundary options may include a visual grid beamed onto the yard via an emitter located above the job site area. In still further configurations, multiple boundary systems, such as those described above, may be used together to increase the accuracy and granularity of the boundary of a given job site.

The AI module 428 may include multiple artificial intelligence algorithms to allow for various learning functions within the autonomous lawn mower 100. In some embodiments, the AI module 428 may communicate with the navigation module 426 to improve the navigation of the autonomous lawn mower 422 over time using AI techniques. For example, if the autonomous lawn mower 100 repeatedly encounters an obstacle, the AI module 428 may communicate with the navigation module 426 to reconfigure the navigation module 426 to adjust the navigation pattern accordingly. The AI module 428 may further be configured to interface with other modules as well, such as the coordination module 430. The AI module may receive data from multiple autonomous lawn mowers 100 via the coordination module 430. Based on the received data, the AI module 428 may be able to determine an optimal operation (e.g. edging, trimming, coordinated cutting, etc.) for the multiple autonomous lawn mowers 100.

The coordination module 428 may be configured to interface with one or more additional autonomous lawn mowers 100. For example, in some embodiments multiple autonomous lawn mowers 100 may be utilized in a swarm or coordinated manner to more effectively complete a job at a given lawn. In other embodiments, the autonomous lawn mowers 100 may be configured to operate as a fleet of devices capable of operating on multiple job sites at a time. The coordination module 100 may be configured to communicate with each of the autonomous lawn mowers 100 on a specific jobsite or within the fleet. In some embodiments, the coordination module 430 may communicate with other autonomous lawn mowers 100 directly via the communications antenna 106 and the communication interface 410. In still other embodiments, the coordination module 430 may communicate with other autonomous lawn mowers 100 via the cloud-based server 418. The coordination module 430 may be configured to collect data from each of the connected autonomous lawn mowers 100. The coordination module 430 may then process the data to provide instructions to each of the autonomous lawn mowers 100.

The safety module 432 may be configured to operate one or more safety functions associated with the autonomous lawn mower 100. In some embodiments, the safety module 432 may communicate with other modules, such as the operating/control module 420, the sensor module 422, the navigation module 426, the AI module 428, and/or the coordination module 430. The safety module 432 may receive data from one or more of the above modules and execute one or more safety functions. For example, the safety module 432 may receive data indicating that the autonomous lawn mower 100 may be in danger (e.g. fall off an edge, overturn, etc.) based on one or more sensed or determined parameters. The safety module 432 may then execute certain safety functions to protect one or more systems within the autonomous lawn mower. Safety functions may include shutting off power to one or more systems within the autonomous lawn mower 100. Further safety systems may include deploying impact reduction devices (e.g. airbags, bumpers, etc.) based on the safety module 432 determining that there may be an impact or collision affecting the autonomous lawn mower 100.

In some embodiments, the safety module 432 may interface with the sensor module 422 to determine if there is a safety risk to a human or animal. For example, if a pet, such as a dog or cat, were to be detected in the vicinity of the autonomous lawn mower 100, the safety module 432 may instruct the operating/control module 100 to reduce speed to avoid the pet or animal, or to cease operating completely until the animal is out of a danger range of the autonomous lawn mower 100. Similarly, if the sensors detect a child near the autonomous lawn mower 100, the safety module 432 may instruct the operating/control module 420 to cease operations completely. In some embodiments, a user may be required to restart the autonomous lawn mower 100 when the safety module 432 executes a safety program. In other embodiments, the safety module 432 may be able to instruct the operating/control module 420 to resume operating when the safety issue has been resolved.

The IoT module 434 module may be configured to interface with one or more remote devices via the wireless communication interface 416. In some embodiments, the IoT module 434 may be configured to communicate with the cloud-based server 418 via the wireless communication interface 416. The cloud-based server 418 may be configured to interface with multiple programs and interfaces, and be accessible via the World Wide Web (e.g. the Internet). This can allow a user to access the controller 400 via any device that has access to the World Wide Web. For example, a user may be able to access the controller 400 via a mobile device such as an internet connected computer, a smartphone (e.g. iPhone, Android phone, Windows phone), a tablet computer (e.g. iPad, Android Table, Microsoft Surface, etc.), or any other internet connected device. In some embodiments, the cloud-based server 418 may provide one or more web-based applications for interfacing between a user device and the controller 400, and thereby the autonomous lawn mower. In other embodiments, the user device may include a client-side application, which can interface with the controller 400 via the cloud-based server 418. In still further embodiments, the user's device may include one or more client-side applications which can be configured to communicate directly to the controller 400 via the wireless communication interface 416, such as via Bluetooth, BLE, NFC, Zigbee, etc. In some embodiments, the user device also includes operator-side applications which can be configured to communicate directly to the controller 400 via the wireless communication interface 416.

The IoT module 434 may include one or more software applications configured to process data or instructions received via the wireless communication interface 416. In some embodiments, the IoT module 434 may process data provided by one of the above described software modules 420-434, and provide that data to a user device or to the cloud-based server 418 via the wireless communication interface 416.

The IoT module 434 may communicate with the cloud-based server 418 to allow for one or more applications related to the autonomous lawn mower 100 to be executed. One application may be a monitoring application for use by a commercial cutter to monitor certain aspects of one or more autonomous lawn mowers in a given fleet. For example, the IoT module 434 may transmit location data provided by the sensor module 422 and/or the navigation module 426 to the cloud-based server 418. Thus, a user may be able to access location information for one or more autonomous lawn mowers 100 via the cloud-based server 418. In further embodiments, the IoT module 434 may transmit various operating parameters relative to the autonomous lawn mower 100 from the operating/control module 420, the sensor module 422, and/or the safety module 432 to the cloud-based server. A user may then access the operating parameters via the cloud-based server 418. Operating parameters may include battery parameters (voltage level, state-of-charge "SoC," state-of-health "SoH," average power and/or current draw, time since last charge, etc.), autonomous lawn mower 100 parameters (speed, temperatures, motor current draw, implement speed, estimated time to completion, etc.), environmental parameters (grass height, moisture levels, outdoor light levels, etc.), errors, and other parameters as applicable. In some embodiment, different users having different permission levels may be able to access different operating parameters, based on their job responsibility. For example, a user responsible for interfacing directly with an individual autonomous lawn mower 100 may have access to some operational parameter information, while a user responsible for monitoring the entire fleet of autonomous lawn mowers 100 may have access to other operational parameter information.

In some embodiments, the IoT module 434 may transmit other lawn characteristic data to the cloud-based server 418 for evaluation. For example, the IoT module may transmit information related to the number or percentage of weeds associated with a given lawn, which may be detected via a weed sensing sensor on the autonomous lawn mower 100. The IoT module 434 may also allow for remote activation or deactivation of the autonomous lawn mower via the cloud-based server 418. This can allow for an owner of the autonomous lawn mower 100 to have control over the operation of the autonomous lawn mowers 100 in their fleet, which may be used upon theft, safety situations, or where a user of the autonomous lawn mower 100 is no longer authorized to operate the autonomous lawn mower 100.

Turning now to FIG. 5, a perspective view of a service vehicle 500 is shown, according to some embodiments. The service vehicle 500 may be utilized by a commercial lawn care or landscaping service to transport tools and equipment, as well as to provide servicing for various outdoor power equipment, including autonomous lawn mowers 100. In some embodiments, the service vehicle 500 may be configured to deliver, monitor, and/or control one or more autonomous lawn mowers 100. As shown in FIG. 5, the service vehicle 500 is configured to include a loading elevator 502, a number of charging and storage bays 504 for the autonomous lawn mowers 100, a loading/unloading ramp 505, a spare battery storage/charging station 506, a number of equipment storage locations 508, a washing station 510, and a controller 512, according to some embodiments.

The loading elevator 502 may be configured to load and stack one or more autonomous lawn mowers 100 onto the service vehicle 500. In some embodiments, the loading elevator 502 may be controlled by controller 512. In other embodiments, the loading elevator may be manually controlled by a user, such as via a manual switch or control. The loading elevator may be configured to move in a lateral direction to lift and lower the autonomous lawn mowers 100, and a longitudinal direction to maneuver the autonomous lawn mowers 100 into the charging/storage bays 504. In other embodiments, the loading elevator 502 may be integrated with the charging/storage bays 504 such that the loading elevator 502 translates along the longitudinal direction to provide access to a specific charging/storage bay 504 within the loading elevator 502. In some configurations, the loading elevator 502 with integrated charging/storage bays 504 may be configured to operate along a central axis such that the individual integrated charging/storage bays 504 can be rotated about the central axis in order to provide access to each of the charging/storage bays 504.

The autonomous lawn mowers 100 may access the loading elevator 502 via the loading/unloading ramp 505. In some embodiments, the loading/unloading ramp 505 may be automatically deployed when an autonomous lawn mower 100 approaches the service vehicle 500. For example, the autonomous lawn mower 100 may transmit a signal to the controller 512 on the service vehicle 500 indicating that the ramp is to be lowered. This signal may further cause the controller to activate the loading elevator 502 to prepare to move the autonomous lawn mower 100 to an open charging/storage bay 504. In some configurations the autonomous lawn mower 100 may be configured to automatically drive up onto the loading/unloading ramp 505. In other embodiments, a user may manually lift the autonomous lawn mower up the loading/unloading ramp 505 to the loading elevator 502. In some configurations, the loading/unloading ramp 505 may be manually controlled by a user, such as by activating a switch or other control device, or by manually lowering and raising the ramp via a mechanical mechanism. In some embodiments, the loading/unloading ramp 505 may be automatically raised and lowered using various configurations. For example, an electric motor, hydraulic actuators, linear electric actuator, pneumatic actuators, and the like may be utilized to raise and lower the loading/unloading ramp.

The loading/unloading ramp 505 may also be configured to lower in order to unload one or more autonomous lawn mowers 100 at a job site. In some embodiments, the loading/unloading ramp 505 may be automatically deployed when the service vehicle 500 arrives at a worksite. In some embodiments, the controller 512 may receive a signal from the driver of the service vehicle 500 that it has arrived at the job site and to lower the loading/unloading ramp 505 to allow for an autonomous lawn mower 100 to be moved to the jobsite to begin operating. In other embodiments, a user may manually operate a control device (e.g. switch, push-button, etc.) to lower the loading/unloading ramp 505, and allow for one or more autonomous lawn mowers 100 to be delivered to the job site. In some embodiments, the controller 512 may determine when the autonomous lawn mower 100 is clear of the loading/unloading ramp 505 and automatically raise the loading/unloading ramp 505 such that the service vehicle 500 can proceed to the next job site if desired. In other embodiments, a user can manually raise the loading/unloading ramp 505 when the job is completed, such as by using the methods described above.

The equipment storage area 508 may be used to store various manually operated outdoor power equipment, such as edge trimmers, seeders, blowers, vacuums, power rakes, zero turn mowers, manual push lawn mowers, power trimmers, tools, and any other required equipment needed to service a given jobsite. The manually operated outdoor power equipment may be fossil fuel powered (e.g. via internal combustion engine), electrically powered (e.g. via Li-Ion batteries), or a combination thereof. In some embodiments, the electrically powered outdoor power equipment may be powered using the battery 104 described above. However, in some embodiments, other battery types may be used to power the outdoor power equipment.

The spare battery storage/charging station 506 may be configured to store one or more batteries, such as batteries 104, which can allow for replacement batteries to be installed into one or more autonomous lawn mowers 100 when there was not sufficient time to charge the autonomous lawn mowers 100 between job sites. The spare battery storage/charging station 506 may also work to charge batteries as well in order to allow for batteries removed from the autonomous lawn mowers 100 to be charged on board the service vehicle 500. In some embodiments, the spare battery storage/charging station 506 may be powered by the service vehicle's 500 alternator or other power system. In some configurations, a separate power system (e.g. supplemental generator, battery system, etc.) may be used to power the spare battery storage/charging station 506. Further, the other components of service vehicle (washing station 510, charging/storage bays 504, robot loading elevator 502, loading/unloading ramp) may be powered using similar configurations. In some embodiments, the controller 512 is in communication with the spare battery storage/charging station 506. The controller 512 may be configured to monitor and control the charging of one or more batteries in the spare battery storage/charging station 506, as will be described in more detail below.

The washing station 510 may be configured to clean one or more pieces of outdoor power equipment, including an autonomous lawn mower 100. The washing station may include a washtub 514, a washing device 516, and a water reservoir 518. The wash tub 514 may be configured to catch water and debris associated with cleaning an outdoor power device. In some embodiments, the washtub 514 may have water jets along the bottom of the washtub 514 to allow for the underside of the outdoor power equipment to be cleaned. The water jets may be pressurized to allow for sufficient cleaning of the outdoor power equipment. In some configurations, the washtub 514 may be configured to accept an autonomous lawn mower, such that the water jets can clean the underside of the autonomous lawn mower, which may collect grass clippings and other debris during operation. In some embodiments, the controller 512 may be configured to control the water jets. The water jets may receive water via the water reservoir 518. The washing device 516 may be a manually operated cleaning device, such as a power washer. The washing device 516 can allow for a user to clean debris from various parts of the outdoor power equipment, as needed. The washing device 516 may receive water via the water reservoir 518.

Figure 6:
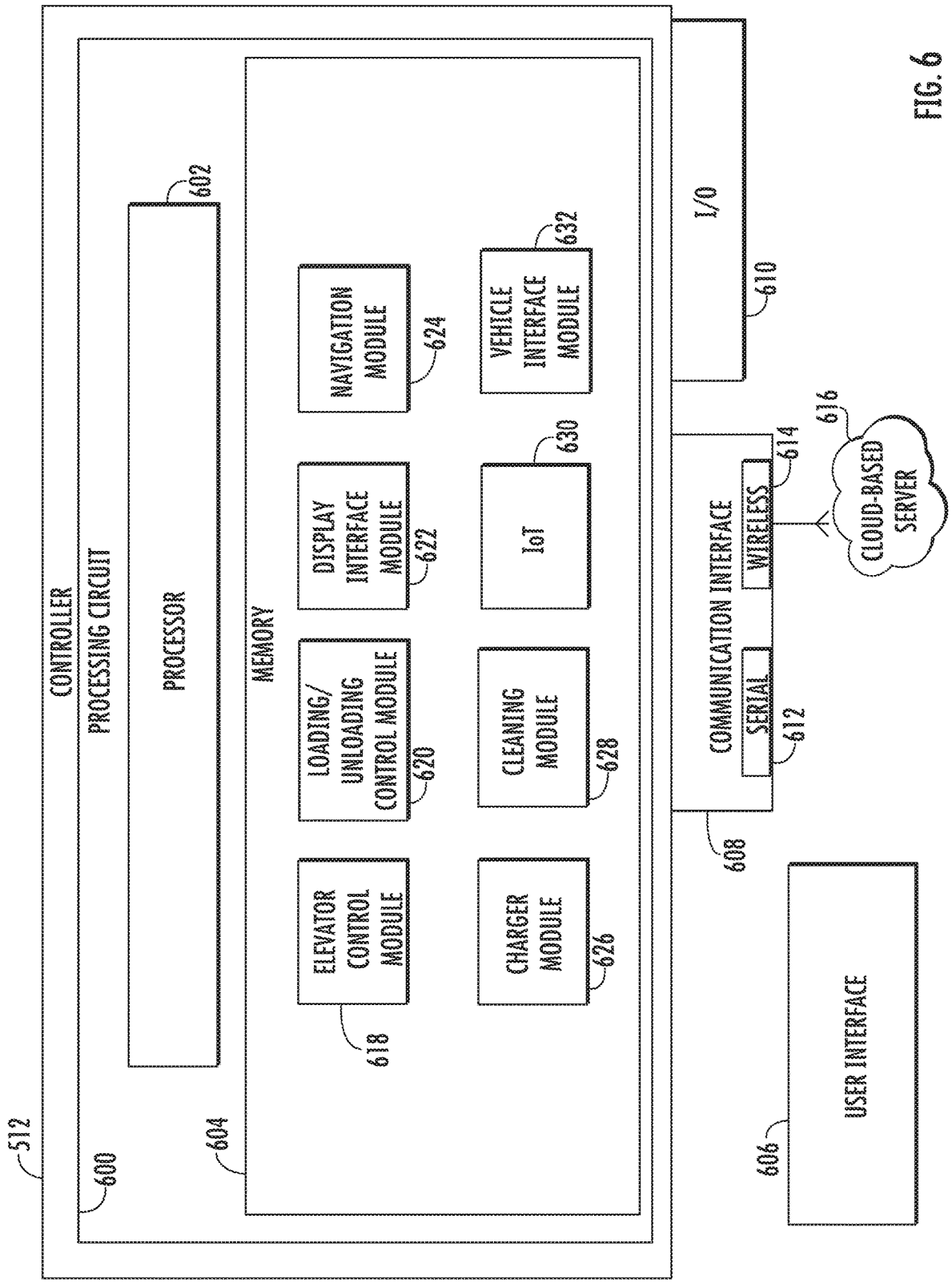
FIG. 6 is a schematic diagram of a controller of the service vehicle of FIG. 5, according to some embodiments.

Turning now to FIG. 6, a block diagram of the controller 512 is shown, according to some embodiments. The controller 512 may include a processing circuit 600. The processing circuit 600 may include a processor 602 and a memory 604. The processor 602 may be general purpose or specific purpose processor, an application specific integrated circuit (ASIC), one or more field programmable gate arrays (FPGAs), a group of processing components (e.g. parallel processing units), a neural network processing system, or other applicable processing circuits. The processor 602 may be configured to execute computer code or instructions stored in the memory 604 or received from other computer readable media, such as physical media (e.g. CD-ROM, DVD-Rom, flash drive, etc.), network drives, remote servers, mobile devices, etc. The memory 604 may include one or more devices (e.g. memory units, memory devices, storage devices, etc.) for storing data and/or computer code for completing and/or facilitating the functions and processes described in the present disclosure. The memory 604 may include random access memory (RAM), read-only memory (ROM) hard drive storage (physical or solid state), temporary storage, non-volatile memory, flash memory, optical memory, or any other suitable memory component for storing software objects and/or computer instructions. The memory 604 may include database components, object code components, script components, or any other type of information structure for supporting the various functions and information structures described in the present disclosure. The memory 604 may be communicably connected to the processor via the processing circuit and may include computer code for executing (e.g. by the processor) one or more processes described herein.

The controller 512 may further be in communication with a user interface 606 associated with the service vehicle 500. The controller 512 may further include a communication interface 608 and an I/O interface 610. The communication interface 608 may include a serial interface 612 and a wireless interface 614. The wireless interface 614 may be coupled to one or more antennas on the service vehicle 500 to allow for transmitting and receiving data.

In one embodiment, the wireless communication interface 608 may be integrated into the controller 512 or via a separate communication module. In some embodiments, the wireless communication module 614 may be configured to communicate using one or more wireless protocols. For example, the wireless communication interface 416 may utilize wireless protocols including Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoW-PAN, Thread, RFID, and other applicable wireless protocols. In some embodiments, the wireless communication interface 614 may be in communication with a cloud-based server 618. In some configurations, the cloud-based server 616 may be the same as cloud-based server 418, described above. The cloud-based server 618 may be configured to interface with multiple programs and interfaces, and be accessible via the World Wide Web (e.g. the Internet). This can allow a user to access the controller 512 (and therefore one or more systems associated with the service vehicle 500) via any device that has access to the World Wide Web. For example, a user may be able to access the controller 512 via a mobile device such as an internet connected computer, a smartphone (e.g. iPhone, Android phone, Windows phone), a tablet computer (e.g. iPad, Android Table, Microsoft Surface, etc.), or any other internet connected device. In some embodiments, the cloud-based server 616 may provide one or more web-based applications for interfacing between a user device and the controller 512, and thereby the associated outdoor power equipment. In other embodiments, the user's device may include a client-side application, which can interface with the controller 512 via the cloud-server 616. In still further embodiments, the user's device may include one or more client-side applications which can be configured to communicate directly to the controller 512 via the wireless communication interface 614, such as via Bluetooth, BLE, NFC, Zigbee, etc.

The serial communication interface 612 of the communication interface 608 may be configured to communicate with one or more systems associated with the service vehicle. The serial communication interface 612 may utilize multiple serial communication protocols and/or hardware, including universal asynchronous receiver-transmitter (UART) communication, a serial peripheral interface bus (SPI), including MOSI, MISO, SCK, CS, and I2C, serial data lines (SDA), serial clock lines (SCL), universal serial bus (USB), RS-232, k-line, CAN, and the like. The I/O interface may be configured to provide communication between the controller 512 to one or systems, subsystems or components on the autonomous lawn mower 100. For example, the I/O module 610 may interface with systems or subsystems of the service vehicle, including, but not limited to, the loading elevator 502, the charging/storage bays 504, the spare battery storage system 506, the washing system 510 and/or the loading/unloading ramp 505. The I/O may be digital, analog, or a combination thereof.

As described above, the memory 406 may include one or more modules, scripts or programs for the processor 604 to execute. In some configurations, the memory 604 may include an elevator control module 618, a loading/unloading control module 620, a display interface module 622, a navigation module 624, a charging module 626, a cleaning module 628 and an IoT module 630. Further, it is contemplated that additional modules may be installed on the memory 406 to configure the controller 400 to control and/or implement additional functions over time. For example, additional modules may be installed to control implements that are designed to attach to the autonomous lawn mower 100. Further, while the following functions are described as being performed by a discrete module, it is contemplated that one or more modules may be involved in performing certain functions. Further, in some configurations, some modules may be configured to perform the functions associated with one of the other modules described below.

The elevator control module 618 may be configured to interface with and provide control to the loading elevator 502 described above. In some embodiments, the elevator control module 618 may interface with one or more elevator control components via the I/O module 610. The elevator control components may include motors, actuators, hydraulic pumps, pneumatic pumps, etc. Via the control via the I/O module 610, the elevator control module 618 may be able to control a movement of the loading elevator 502. For example, the elevator control module 618 may be configured to raise and lower the loading elevator 502 as needed. In some embodiments, the elevator control module 618 may receive a signal indicating that an autonomous lawn mower 100 needs to be loaded. In some embodiments, the signal may be provided via the I/O 610 and/or the serial communication interface 612. For example, a user may provide an indication that an autonomous lawn mower needs to be loaded into the elevator. In other embodiments, the elevator control module 618 may receive a signal that an autonomous lawn mower 100 needs to be loaded via one of the other software modules, such as the loading/unloading control module 620, the navigation module 624, and/or the charging module 626. In still further embodiments, the elevator control module 618 may receive a wireless signal via the wireless interface 614 indicating that an autonomous lawn mower needs to be loaded or unloaded. For example, an autonomous lawn mower 100 may transmit a signal to the elevator control module. In other examples, a wireless signal may be provided to the elevator control module via a wireless device of a user.

In some embodiments, the elevator control module 618 may be configured to control a secondary device, such as a linear actuator, to extend a tray from the loading elevator 504 during loading and unloading of autonomous lawn mowers 100, as shown in FIG. 5. In further embodiments, the elevator control module 618 may be in communication with one or more sensors or other devices in the loading elevator 502. The sensors may provide an indication as to whether a given slot or carrier within the loading elevator 502 is open or occupied (e.g. contains an autonomous lawn mower 100). For example, where the charging/storage bays 504 are integrated into the loading/unloading elevator 502, the elevator control module 618 would be able to provide an indication of which portions of the loading elevator 502 were occupied by autonomous lawn mowers 100. In some embodiments, the loading elevator 502 may have additional sensors or other devices to determine one or more aspects of the autonomous lawn mower 100 on the loading elevator 502. For example, the loading elevator may include a number of short range wireless sensors (e.g. NFC, RFID, etc.) for determining identifying information about a loaded autonomous lawn mower 100. In other configurations, other sensors, such as visual sensors, laser readers, or contact surfaces (for interfacing with a corresponding contact surface on the autonomous lawn mower 100) may be used to read or receive data on the autonomous lawn mower 100 to determine the identifying information. In some embodiments, the identifying information may include a unit number, a unit name, a serial number, or similar information.

The elevator control module 618, having received the identifying information from the autonomous lawn mower 100, may then provide that information to one or more other modules, such as the loading/unloading control module 620, the display interface module 622, the navigation module 624, the charging module 626, the cleaning module 628, and/or the IoT module 630. This can allow for the one or more other modules to access the autonomous lawn mower 100 to determine one or more associated parameters. In some configurations, the other modules may be configured to access the autonomous lawn mowers 100 via the wireless interface 614. However, the communication to the autonomous lawn mowers 100 may be performed via other interfaces, such as via serial interface 612 or via the I/O 610. In still further embodiments, a user may input the identifying information via the user interface 606, which can then be received by one or more of the modules 618-630.

As described above, a user may control the loading elevator 502 via a switch or other control device on the service truck 500. The elevator control module 618 may be configured to receive a signal from the manual controls via the I/O 610, the serial interface 612, and/or the wireless interface 614. The elevator control module 618 may be further configured to send control signals to the loading elevator 502 to perform the operations indicated by the manual control by the user. The elevator control module 618 may further include various safety features to prevent damage to the loading elevator 502 and/or one or more autonomous lawn mowers 100. For example, safety switches, limit switches, optical sensors (e.g. light beams), pressure switches, and the like may indicate that the elevator is at a limit of operation, or that an obstruction (e.g. an autonomous lawn mower 100) is present, inhibiting movement. The elevator control module 618 may then prevent additional movements of the loading elevator if it is determined a limit is reached, or a potential risk is present. The elevator control module 618 may be configured to override manual controls by a user as well when continued operation could result in damage to the loading elevator 502 and/or an autonomous lawn mower 100. In some instances, the elevator control module 618 may provide an alert or explanation to a user when operation is halted. For example, the elevator control module 618 may communicate with the user via the user interface. In other embodiments, the elevator control module 618 may push a communication to a mobile device associated with the user via the wireless interface 614. In still further embodiments, the elevator control module 618 may communicate with the cloud-based server 616 to alert that further operation is not possible, or has been limited. The contents of the communication, and the communication method may depend on the importance of the reason for operation being ceased.

The loading/unloading control module 620 may be configured to handle the loading and unloading of one or more autonomous lawn mowers 100 to and from the service vehicle 500. For example, the loading/unloading control module 620 may be configured to control the loading/unloading ramp 505 and/or the charging storage bays 504. In some embodiments, the loading/unloading control module 620 may receive a signal, via the communication interface 608, indicating that an autonomous lawn mower needs to be unloaded at a jobsite. In some embodiments, the signal may be provided by a user via the user interface 606. In other embodiments, the signal may be based on a location of the service vehicle 500. For example, the loading/unloading control module 620 may receive a signal from a location device such as a GPS. In some configurations, the signal may be provided by the navigation module, which may be in communication with one or more location systems, including GPS, differential GPS, or other location determining system. The loading/unloading control module 620 may further receive information from the vehicle interface module 632. For example, the vehicle interface module 632 may provide a signal to the loading/unloading control module 620 indicating that the service vehicle 500 is in a safe condition for an autonomous lawn mower 100 to be loaded or unloaded. Example safe conditions may include ensuring the vehicle is at a complete stop, that the transmission is in park, that an airbrake or parking brake has been engaged, that there are no persons or obstacles near the loading/unloading ramp, etc.

The loading/unloading control module 620 may then instruct the loading/unloading ramp 505 to lower. The loading/unloading control module 620 may also communicate with the elevator control module 618 to move the desired autonomous lawn mower 100 into position to be unloaded. In some embodiments, the loading/unloading control module 620 may communicate with the charging module 626 to determine which autonomous lawn mower 100 has a charged status to complete a given job. In some embodiments, the loading/unloading control module 620 may have access to the estimated charge required for a given job site. For example, each job site may have certain parameters stored in the cloud-based server 616, which the loading/unloading control module 620 may be able to access via the wireless communication interface 614. In some embodiments, the job information may be provided to the loading/unloading control module 620 via the IoT module 630. Once the loading/unloading control module 620 has lowered the loading/unloading ramp 505, and the loading elevator 502 has positioned an autonomous lawn mower 100 in position, the loading/unloading control module 620 may transmit a signal to the autonomous lawn mower 100 to instruct it to debark the service vehicle 500. In some embodiments, the loading/unloading control module 620 may communicate with the autonomous lawn mower 100 via the wireless communication interface 614. In other embodiments, the loading/unloading control module 620 may interface with the autonomous lawn mower 100 via the serial communication interface 612, such as via a connection point in the loading elevator 502.

The loading/unloading control module 620 may also receive a signal that an autonomous lawn mower 100 is required to be loaded onto the service vehicle 500. Similar to above, the loading/unloading control module 620 may receive an input directly from the autonomous lawn mower 100. In other configurations, the user may provide a signal indicating that an autonomous lawn mower 100 needs to be loaded onto the service vehicle 500. Upon receiving the signal, the loading/unloading control module 620 may verify that it is safe to commence the loading process. For example, the loading/unloading control module 620 may first determine that the service vehicle is in the proper location to load the autonomous lawn mower 100. The loading/unloading control module 620 may also interface with the vehicle interface module 632 to verify that the service vehicle is in a safe condition to load the autonomous lawn mower 100, as described with respect to the unloading process.

The loading/unloading control module 620, determining that the service vehicle 500 is ready to load an autonomous lawn mower 100 may be configured to instruct the loading/unloading ramp 505 to lower, and further instruct the loading elevator 502 to position an open bay to receive the autonomous lawn mower 100, such that the autonomous lawn mower 100 may be able to access the open bay via the loading/unloading ramp 505. The loading/unloading control module 620 may further activate one or more sensors or beacons to assist the autonomous lawn mower 100 to successfully load the autonomous lawn mower into the loading elevator 502. The loading/unloading control module 620 may further be configured to transmit a signal to the autonomous lawn mower 100, via the wireless communication interface 614, that it can load itself onto the service vehicle 500. Once the loading/unloading control module 620 determines that the autonomous lawn mower has been loaded onto the service vehicle 500, the loading/unloading control module 620 may then provide a signal to the charging module 626 to instruct it to begin charging the autonomous lawn mower 100. The loading/unloading control module 620 may then transmit a signal to the cloud-based server 616 that the autonomous lawn mower 100 has been loaded, along with other data regarding the loading process and/or the autonomous lawn mower 100. For example, the loading/unloading module 500 may receive parameters from the autonomous lawn mower 100, such as battery charge level, run time at job site, any error codes, etc. Further, the loading/unloading control module 620 may also transmit general loading data, such as time of loading, the location (e.g. as provided by the navigation module 624) of the loading, etc.

The display interface module 622 may be configured to interface with and control the user interface 606. For example, the display interface module 622 may be configured to display messages or other data provided by other modules to the user interface 606. In further embodiments, the display interface module 622 may also be configured to receive data input into the user interface 606 by a user, and further configured to pass the received data to one or more other modules as needed.

The navigation module 624 may be configured to provide navigation instructions of the service vehicle 500. In some configurations, the navigation module 624 may be configured to control the navigation of the service vehicle 500, where the service vehicle is configured as an autonomous service vehicle 500. In some embodiments, the navigation module 624 communicates navigation instructions to the user interface 606, which may be viewable by the user (e.g. driver) of the service vehicle. In other configurations, the navigation module 624 may provide navigation instructions to the vehicle interface module 632, which may then pass the navigation to one or more vehicle interfaces which may provide navigation instructions to the operator of the service vehicle 500. For example, the navigation module 624 may communicate with a navigation display in the cab of the service vehicle 500 via the vehicle interface module 632, which may provide guidance to jobsites to the operator via the navigation display. In other configuration, the navigation module 624 may be configured to interface directly with a navigation display in the cab of the service vehicle 500. In some configurations, the navigation module 624 may be in communication with a locating antenna on the service vehicle 500 configured to receive location data. For example, the locating antenna may be a GPS antenna. The navigation module 624 may also be in communication with one or more sensors to determine a location of the service vehicle 500. For example, the navigation module 624 may communicate with Wi-Fi hotspots, cellular towers, local GPS transmitters, differential GPS transmitters, and the like. The navigation module may receive data from the sensors, the locating antenna, or both when determining the location of the service vehicle. In some embodiments, the navigation module 624 may be configured to transmit and receive location data to the cloud-based server 616 via the wireless interface 614.

In some embodiments, the navigation module 426 may receive instructions regarding a specific route or waypoint that the service vehicle is to follow. In one configuration, the navigation module may receive specific routes or waypoints via the cloud-based server 616. For example, the cloud-based server may provide an optimized route to the navigation module 624 based on the specific job sites to be serviced in a given day. In other embodiments, the cloud-based server 616 may provide the navigation module 624 with real-time route guidance based on the status of one or more autonomous lawn mowers 100 in operation. In other configurations, job site status may be used to determine the route provided to the navigation module 624, which may be provided by the autonomous lawn mowers 100, the job site workers, or both. In some embodiments, the navigation module 426 may receive instructions via the user interface 606 and/or via the communication interface 608.

The charging module 626 may be configured to control both the charging/storage bays 504 and/or the spare battery storage/charging station 506. In some embodiments, the charging module 626 may receive data from the charging/storage bays 504 and/or the spare battery storage/charging station 506. In some configurations, the charging module 626 may receive data via the I/O interface 610, the communication interface 608, or a combination thereof. The data may include information such as charge levels of individual batteries, battery temperatures, charging time, etc. The charging module 626 may be configured to interface with the charging/storage bays 504 and/or the spare battery charging/storage station 506. For example, the charging module 626 may be configured to control a rate of charge for one or more batteries being charged within the charging/storage bays 504 and/or the spare battery charging/storage station 506. In some configurations, the charging module 626 may be configured to prioritize charging of certain batteries within the charging/storage bays 504 and/or the spare battery charging/storage station 506. For example, the charging module 626 may be configured to use more available charging energy to charge a battery associated with an autonomous lawn mower 100 that is scheduled to be placed at a jobsite within a given time window. In other examples, the charging module 626 may prioritize the charging of various batteries within the charging/storage bays 504 and/or the spare battery charging/storage station 506, and adjust power provided to each of the batteries based on available power for charging. This could include providing more power to high priority batteries when the service vehicle 500 is in motion in order to draw more charging power from the alternator. In embodiments where the service vehicle has a dedicated power source for non-driving functions (e.g. charging batteries, operating the loading elevator 502, etc.), the charging module 626 may be configured to determine the power available for charging batteries, and charging the batteries in the charging/storage bays 504 and/or the spare battery charging/storage station 506 based on an associated priority.

The cleaning module 628 may be configured to control the cleaning station 510. In one embodiment, the cleaning module 628 may control a power source configured to drive the power washer 516 or other water pressurization device. In some embodiments, the cleaning module 628 may be configured to monitor a water level in the water holding tank 518. The water level may be presented to the user via the user interface 606 and/or via an interface of the service vehicle 500 via the vehicle interface module 632. The cleaning module 628 may further be configured to interface with one or more auxiliary cleaning devices, such as a cleaning solution injector which may be used to inject a cleaning solution into a water stream used by the cleaning bay 510. In some configurations, the cleaning module 626 may be configured to communicate with the cleaning station 510 and its various components via the I/O interface 610. In other configurations, the cleaning module 626 may be configured to communicate with the cleaning station 510 and its various components via the communication interface 608.

The IoT module 630 module may be configured to interface with one or more remote devices or services via the wireless communication interface 614. In some embodiments, the IoT module 630 may be configured to communicate with the cloud-based server 616 via the wireless communication interface 614. The cloud-based server 616 may be configured to interface with multiple programs and interfaces, and be accessible via the world wide web (e.g. the Internet). This can allow a user to access the controller 512 and the associated devices controlled by the controller 512, as described above, via any device that has access to the world wide web. For example, a user may be able to access the controller 512 via a mobile device such as an internet connected computer, a smartphone (e.g. iPhone, Android phone, Windows phone), a tablet computer (e.g. iPad, Android Table, Microsoft Surface, etc.), or any other internet connected device. In some embodiments, the cloud-based server 616 may provide one or more web-based applications for interfacing between a user device and the controller 512, and thereby the various functionality of the service vehicle. In other embodiments, the user's device may include a client-side application, which can interface with the controller 512 via the cloud-based server 616. In still further embodiments, the user's device may include one or more client-side applications which can be configured to communicate directly to the control unit via the wireless communication interface 614, such as via Bluetooth, BLE, NFC, Zigbee, etc.

The IoT module 630 may include one or more software applications configured to process data or instructions received via the wireless communication interface 614. In some embodiments, the IoT module 630 may process data provided by one of the above described software modules 618-632, and provide that data to a user device or to the cloud-based server 616 via the wireless communication interface 614.

The IoT module 630 may communicate with the cloud-based server 616 to allow for one or more applications related to the service vehicle 500 to be executed. One application may be a monitoring application for use by a commercial cutter to monitor certain aspects of one or more service vehicles in a given fleet. For example, the IoT module 630 may transmit location data provided by the navigation module 624 to the cloud-based server 616. Thus, a user may be able to access location information for one or more service vehicles 500 via the cloud-based server 616. In further embodiments, the IoT module 630 may transmit various operating parameters relative to the service vehicle 500 from any of the software modules 618-632 to the cloud-based server 616. A user may then access the operating parameters via the cloud-based server 616. Operating parameters may include fuel levels, miles traveled, operating times, inventory of autonomous lawn mowers 100, engine temperature, speed, RPM, stop times, routes, cleaning fluid on board, tire pressure, status of loading/unloading ramp 505, or any other data as described above. In some embodiment, different users having different permission levels may be able to access different operating parameters, based on their job responsibility. For example, a user responsible for interfacing directly with service vehicle 500 may have access to some operational parameter information, while a user responsible for monitoring the entire fleet of service vehicles 500 may have access to other operational parameter information.

The IoT module 630 may further interface with one or more scheduling applications. Various data may be provided to the scheduling applications, including number of times an autonomous lawn mower 100 is interrupted (e.g. by pets, children, or adults interfering with the operation of the autonomous lawn mower), the time the interruptions occurred, and other data points, such as noise complaints from homeowners or neighbors. Based on the data, the scheduling application may be configured to provide optimized times for the autonomous lawn mower 100 to be deployed at a given job site (as well as other work be performed).

The IoT module 630 may further interface with an optimization program which may provide the most optimized route for the service vehicle. The optimization program may work to increase run time of the autonomous lawn mowers 100, decrease stop time (e.g. time between autonomous lawn mower 100 completing a job and being picked up by the service vehicle 500). The optimization program may also evaluate the optimized schedules for each lawn, such as data provided by the scheduling application described above. The optimization application may further evaluate the battery status of individual autonomous lawn mowers 100 to ensure that there will not be downtime (or limited downtime) associated with a drained battery on an autonomous lawn mower 100.

The IoT module 630 may be configured to determine the optimal schedule and placement of mowers 100 within a fleet on a day-to-day basis. The IoT module 630 may be configured to pull in third party data, such as weather forecasts and traffic conditions, to determine optimal scheduling. For example, the IoT module 630 can determine that there is an 80 percent chance of rain in a specific location at a specific time and reroute the mowers 100 to complete jobs in other locations during that time and reschedule the mowers 100 to complete jobs in that location during a time when rain is not forecast. As a further example, the IoT module 630 can determine that a traffic accident has occurred on the route typically taken from one jobsite to the next and send notifications to personnel and suggest an alternative route to get to the next jobsite. The IoT module 630 can additionally reconfigure routes and mowers 100 in response to a notification that a mower 100 is incapable of performing a job or is out of order. In addition, the IoT module 630 can time the operation of the autonomous lawn mower 100 with how long it takes to perform other work at the same jobsite (e.g., time to trim hedges, mulch, etc.).

The vehicle interface module 632 may be configured to interface directly with the service vehicle 500. In some embodiments, the vehicle interface module 632 may interface directly with the one or more service vehicle control systems via the serial communication interface 608. In some configurations, the serial communication interface may directly interface with the Vehicle Communication Interface (VCI) associated with the service vehicle 500. For example, the serial communication interface 608 may communicate with the VCI via various protocols, including AFDX, ARINC 429, Byteflight, CAN, D2B, FlexRay, DC-Bus, IDB-1394, IEBus, I2C, ISO 9141, J1708, J1587, J1850, J1939, Keyword Protocol 2000, LIN, MOST, Multifunction Vehicle Bus, SMARTwireX, SPI, VAN, or other applicable protocols. Accordingly, the vehicle interface module 632 may then have access to service vehicle data available to the on-board controllers of the service vehicle 500. The vehicle data may include engine data, fuel economy data, emissions data, safety system data, and the like.

Figure 7:
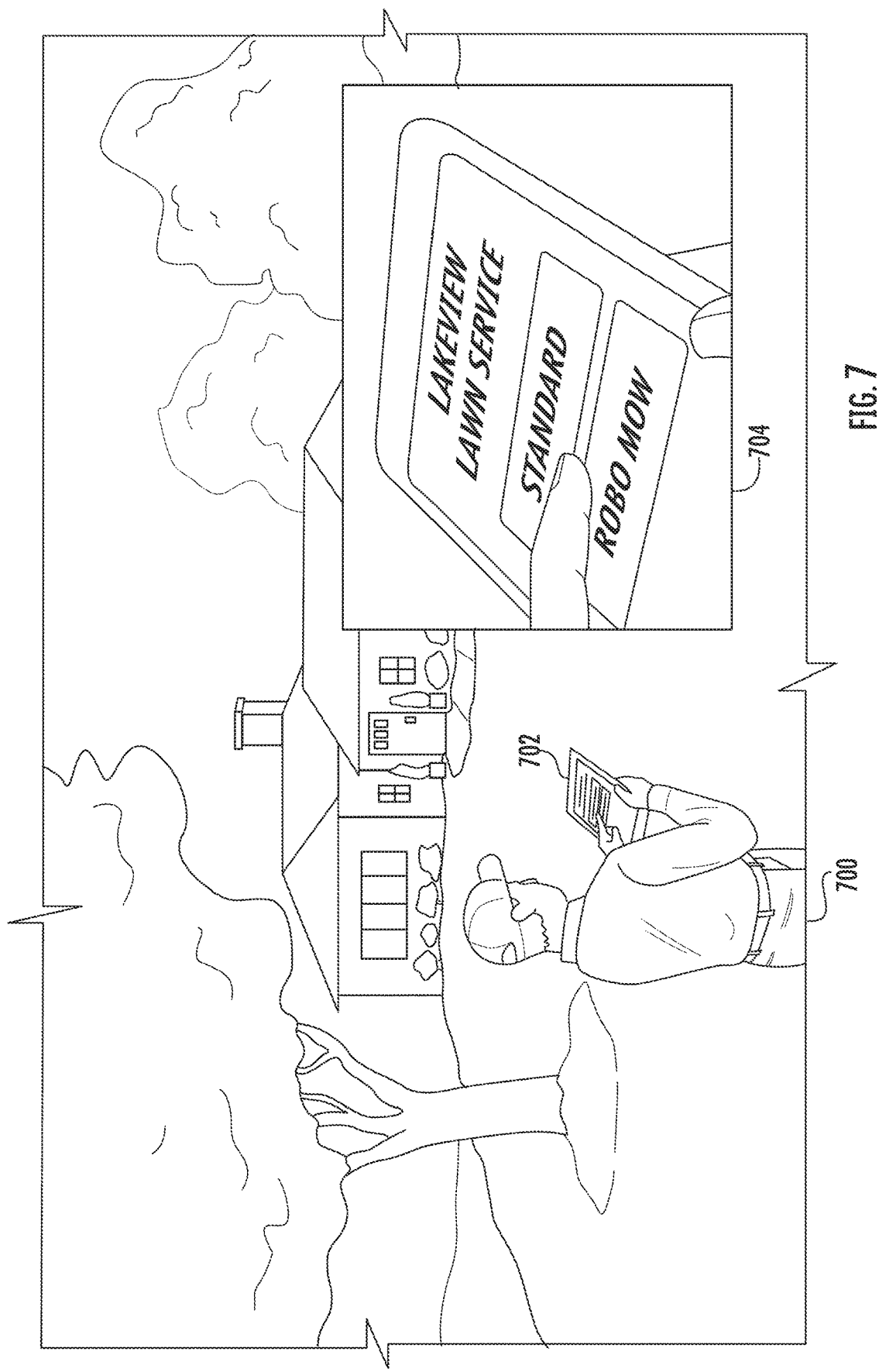
FIG. 7 is a system view illustrating a lawn care technician preparing a yard for service, according to some embodiments.

FIGS. 7-10 illustrate various examples of the autonomous lawn mowers 100 and/or service vehicles 500 being used in operation by a user, such as a commercial lawn care company. As shown in FIG. 7, a user 700, such as an employee of a commercial lawn care service, may come to survey the lawn of a new or existing customer. The user 700 may have a user device 702. In some embodiments, the user device 702 may be connected to one or more of the cloud-based servers described above via a wireless communication network. For example, the user device 702 may access the cloud-based servers via a cellular connection, a Wi-Fi connection, or via other applicable wireless communication protocol. The user device 702 may be any mobile device capable of communicating with a cloud-based server, such as a cellular phone, a tablet computer, a laptop computer, a dedicated computing device, etc. The user device 702 generally has a user interface 704, such as a touch screen interface.

The user 700 may evaluate the lawn or jobsite using the user device 702. In some embodiments, the user 700 may map out the lawn. Mapping out the lawn may include determine a square footage of areas that will require work to be performed. In some embodiments, the user 700 may use one or more features associated with the user device 702 to map out the lawn. For example, the user device 702 may include cameras, location systems (e.g. GPS), or other sensors which may allow the user to use the user device 702 to survey the yard. In other configurations, the user device 702 may be able to interface with other devices to assist in mapping out the lawn. For example, the user device 702 may be in communication with a drone which may include various sensors, such as cameras, location sensors, laser imagers, altimeters, etc. The drone can interface with the user device 702 to provide an overhead view. The user device 702 may then be configured to process the images or data provided by the drone. For example, the drone may be able to use one or more sensors to create a topographical image of the lawn in being evaluated and transmit the topographical image to the user device 702. The user 700 may then be able to use the user interface 704 of the user device 702 to outline the property, define boundaries (e.g. around obstructions, flower beds, etc.), or highlight areas requiring lawn service or landscaping. The user 700 may then be able to use the user device 702 to outline the work required based on a customer's specification. In some embodiments, the user device 702 may include one or more augmented reality (AR) functions which allow the user to utilize a camera on the user device 700 and/or provided by the drone to modify the lawn in real-time based on the customer's requirements, and allow the customer to view the proposed work to verify it is correct via the user interface 704 of the user device 702.

In some embodiments, the user 700 may be able to provide a quote to the user based on the information provided to the user device 700. As shown in FIG. 7, the user 700 may be able provide quotes based on whether the lawn care will be done via manual labor, or if the lawn care will be, at least partially, performed by one or more autonomous lawn mowers 100. The user device 702 may also provide detailed breakdown of costs for the customer, such as Return-of-Investment (ROI) for installing the initial hardware required to operate an autonomous lawn mower, cost savings over time based on various intervals of servicing the lawn, etc. The ROI may also be based on the life of the autonomous lawn mower 100, the cut time of the autonomous lawn mower 100, and other costs to install and operate the autonomous lawn mower 100. Based on the quoted cost, a customer may indicate to the user 700 what, if any, services they would like.

The overall cost of the autonomous lawn mower 100 may include cost of repair parts, maintenance, fuel, downtime of the equipment, overall health of the equipment, including age, how often repairs and maintenance are required, and so on, are used to determine the total cost of ownership. Using past data about the mower 100, various modules of the controller 400 (e.g., sensor module 422, AI module 428) can predict when the equipment costs more money to maintain and repair than the revenue the equipment is generating. The controller 400 can also receive input from the operator and other personnel regarding fuel usage costs, unit performance, etc. Thus, the controller 400 can predict when the equipment needs to be replaced.

Figure 8:
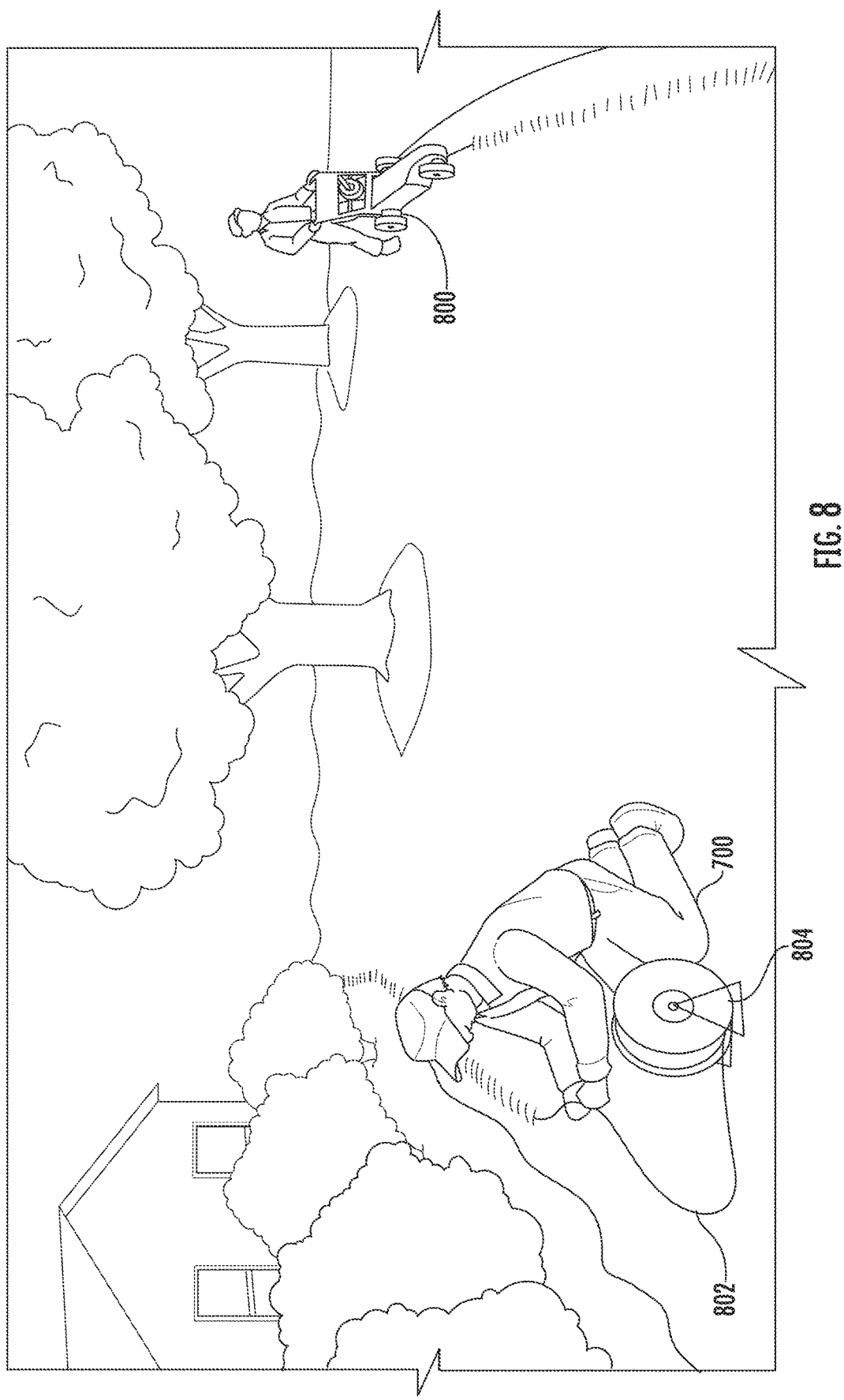
FIG. 8 is a system view of a service team preparing a yard for service by one or more autonomous devices, according to some embodiments.

Turning now to FIG. 8, a number of users 700 are installing a boundary wire system for use with an autonomous lawn mower 100. In some embodiments, one user 700 may utilize an automatic digging device 800. In some configurations the automatic digging device 800 may simply dig a small trench, at a depth below the frost line, for use in installing a boundary wire system. In other configurations, the automatic digging device 800 may be configured to automatically lay the boundary wire from a spool attached to the automatic digging device 800. The automatic digging device 800 may further be configured, in some embodiments, to backfill the trench once the boundary wire has been installed. In some instances, a second user 700 may install a boundary wire 802 via a spool 804, once the trench has been dug by the automatic digging device 800, or otherwise. The boundary wire 802, as described above, may carry a current or transmit a signal which may be received by an autonomous lawn mower 100. While FIG. 8 describes the installation of a boundary wire, other configurations for providing one or more boundaries to the autonomous lawn are also contemplated, as described above.

Figure 9:
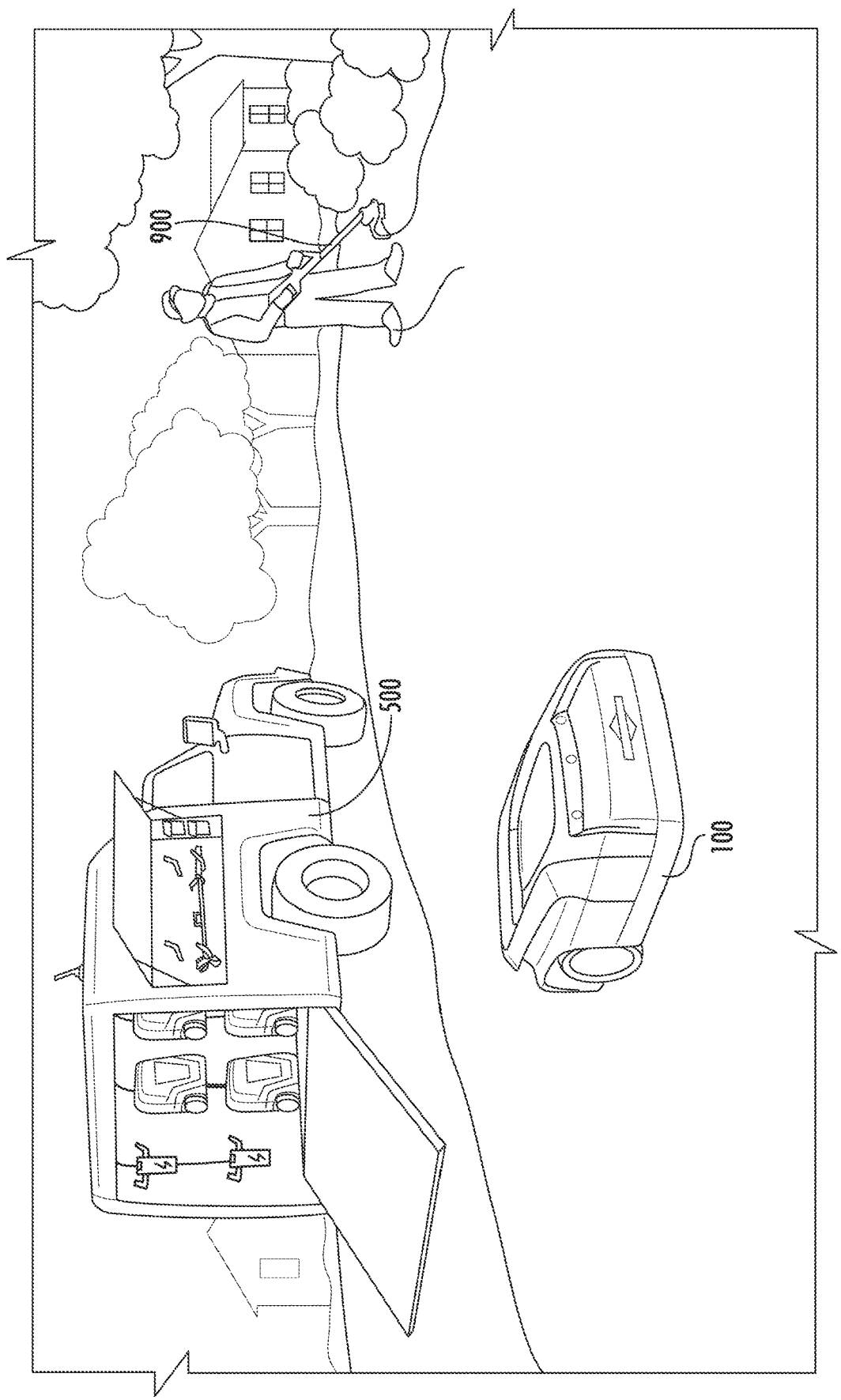
FIG. 9 is a system view illustrating an autonomous lawn care device operating in conjunction with a lawn service technician.

FIG. 9 illustrates an autonomous lawn mower 100 working in conjunction with a user 700 on a jobsite. As shown in FIG. 9, the autonomous lawn mower 100 may cut the lawn, while the user 700 (e.g. an employee of a commercial lawn service company) does trimming work with a manually operated string trimmer 900. As further shown in FIG. 9, the autonomous lawn mower 100 and the string trimmer 900 may be stored and operated via the service vehicle 500.

Finally, FIG. 10 illustrates a service vehicle 500 dropping off autonomous lawn mowers 100 at a number of lawns and then subsequently retrieving the autonomous lawn mowers 100 from the lawns upon completion of the work. As described above, the autonomous lawn mower 100 may provide indications to the service vehicle 500 that the job is completed, or that it is ready to be picked up.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. An autonomous lawn mower, comprising:
   a removable battery having a capacity of at least 800 Watt-hours;
   a plurality of sensors;
   one or more wheels;
   a cutting blade;
   one or more antennas;
   a controller configured to allow the autonomous lawn mower to perform a grass cutting function at a jobsite and to control a height of the cutting blade without human interaction;
   one or more motors; and
   at least one of an accelerometer and a gyroscope;
   wherein the controller is further configured to:
      determine whether a roll angle is greater than a first predefined amount, wherein the roll angle is measured from at least one of the accelerometer and the gyroscope;
      in response to determining the roll angle is greater than the first predefined amount, stop operation of one of the one or more motors configured to provide rotational drive power to the cutting blade; and
   wherein the controller is further configured to:
      determine whether the roll angle is greater than a second predefined amount; and
      in response to determining the roll angle is greater than the second predefined amount, stop operation of each of the one or more motors.

2. The autonomous lawn mower of claim 1, further comprising a number of attachment points, the attachment points configured to receive an attachment device.

3. The autonomous lawn mower of claim 2, wherein the attachment points comprise one or more input/output (I/O) ports to electrically couple the attachment device to the autonomous lawn mower.

4. The autonomous lawn mower of claim 2, wherein the attachment device comprises one or more of an edging device, a string trimmer, a torch, a sprayer device, a chemical dispenser, a sensor, and a communication module.

5. The autonomous lawn mower of claim 1, wherein the removable battery is configured to be removed without the use of a tool.

6. The autonomous lawn mower of claim 1, wherein the removable battery is a rechargeable lithium-ion battery.

7. The autonomous lawn mower of claim 1, wherein one or more antennas include at least one of a communication antenna and a locating antenna, the communication antenna is electrically coupled to the controller and configured to provide communication to the controller via one or more wireless protocols and the locating antenna is configured to communicate with one or more locating protocols to provide location information to the controller.

8. The autonomous lawn mower of claim 1, further comprising a processing circuit comprising an operating and control module configured to operate the autonomous lawn mower in a plurality of operating modes based on a user input.

9. The autonomous lawn mower of claim 8, wherein the operating modes are a plurality of pre-programmed patterns for cutting a lawn.

10. The autonomous lawn mower of claim 1, further comprising a processing circuit comprising a coordination module configured to communicate with one or more other autonomous lawn mowers to allow for coordinated cutting of a fleet of autonomous lawn mowers at a single job site or at a plurality of job sites.

11. The autonomous lawn mower of claim 1, further comprising:
   an actuator or motor coupled to the cutting blade, wherein the controller is further configured to control the actuator or motor to change an elevation of the cutting blade to control the height of the cutting blade.

12. The autonomous lawn mower of claim 1, further comprising:
   an actuator coupled to the cutting blade, wherein the controller is further configured to control the actuator to change a pitch or angle of the cutting blade during operation.

13. The autonomous lawn mower of claim 1, further comprising:
   an actuator or motor coupled to the one or more wheels, wherein the controller is further configured to control the actuator or motor to adjust a height of the one or more wheels to control the height of the cutting blade.

* * * * *